(12) United States Patent
Cho et al.

(10) Patent No.: US 7,777,822 B2
(45) Date of Patent: Aug. 17, 2010

(54) ARRAY SUBSTRATE FOR LCD DEVICE HAVING DOUBLE-LAYERED METAL STRUCTURE AND MANUFACTURING METHOD THEREOF

(75) Inventors: Won-Ho Cho, Gyeongsangbuk-do (KR); Gyoo-Chul Jo, Gunpo-si (KR); Gue-Tai Lee, Gyeongsangbuk-do (KR); Jin-Gyu Kang, Icheon (KR); Beung-Ilwa Jeong, Gyeongsangbuk-do (KR); Jin-Young Kim, Incheon (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 12/078,048

(22) Filed: Mar. 26, 2008

(65) Prior Publication Data

US 2008/0182352 A1 Jul. 31, 2008

Related U.S. Application Data

(62) Division of application No. 10/875,559, filed on Jun. 25, 2004, now Pat. No. 7,605,877.

(30) Foreign Application Priority Data

Jun. 30, 2003 (KR) .................. 10-2003-0043946

(51) Int. Cl.
*G02F 1/136* (2006.01)
(52) U.S. Cl. ........................ 349/43; 349/152
(58) Field of Classification Search .................. None
See application file for complete search history.

(56) References Cited

U.S. PATENT DOCUMENTS

| 5,650,834 A | 7/1997 | Nakagawa et al. |
| 6,043,511 A | 3/2000 | Kim |
| 6,091,464 A | 7/2000 | Song |
| 6,380,559 B1 | 4/2002 | Park et al. |
| 2002/0081847 A1 | 6/2002 | Jo et al. |
| 2002/0117691 A1 | 8/2002 | Choi et al. |
| 2002/0159018 A1* | 10/2002 | Kataoka et al. ............. 349/143 |

FOREIGN PATENT DOCUMENTS

| JP | 2002-026335 | 1/2002 |
| KR | 10-2002-0052562 | 7/2002 |
| KR | 10-2002-0074302 | 9/2002 |

\* cited by examiner

*Primary Examiner*—Doug Nguyen
*Assistant Examiner*—Lucy P Chien
(74) *Attorney, Agent, or Firm*—McKenna Long & Aldridge LLP

(57) ABSTRACT

An array substrate in a liquid crystal display device includes a gate electrode, a gate line and a gate pad on a substrate, wherein the gate electrode, the gate line and the gate pad have a double-layered structure consisting of a first metal layer and a first barrier metal layer in series from the substrate, and wherein the first metal is one of aluminum and aluminum alloy; a gate insulation layer; an active layer and an ohmic contact layer; a data line, source and drain electrodes, and a data pad each having a double-layered structure consisting of a second barrier metal layer and a second metal layer of copper; a passivation layer; and a pixel electrode, a gate pad terminal and a data pad terminal on the passivation layer formed of a transparent conductive material.

10 Claims, 50 Drawing Sheets

ARRAY SUBSTRATE FOR LCD DEVICE HAVING DOUBLE-LAYERED METAL STRUCTURE AND MANUFACTURING METHOD THEREOF

The present application is a divisional application of application Ser. No. 10/875,559 filed Jun. 25, 2004 now U.S. Pat. No. 7,605,877 which claims the benefit of Korean Patent Application No. 2003-0043946, filed on Jun. 30, 2003, which are hereby incorporated by reference for all purposes as if fully set forth herein.

BACKGROUND OF THE INVENTION

1. Field of the Invention

The present invention relates to a liquid crystal display (LCD) device, and more particularly, to an array substrate having a double-layered metal structure in the gate and data lines.

2. Discussion of the Related Art

In general, since flat panel display devices are thin, light weight, and have low power consumption, they are increasingly being used for displays in portable devices. Among the various types of flat panel display devices, liquid crystal display (LCD) devices are widely used for laptop computers and desktop monitors because of their superiority in resolution, color imaging display, and display quality.

LCD devices use the optical anisotropy and polarization properties of liquid crystal molecules to produce a desired image. Liquid crystal molecules have a definite inter-molecular orientation that results from their peculiar characteristics. The specific orientation can be modified by an electric field that is applied across the liquid crystal molecules. In other words, electric fields applied across the liquid crystal molecules can change the orientation of the liquid crystal molecules. Due to optical anisotropy, incident light is refracted according to the orientation of the liquid crystal molecules.

Specifically, the LCD devices have upper and lower substrates with electrodes that are spaced apart and face each other, and a liquid crystal material is interposed therebetween. When a voltage is applied to the liquid crystal material by the electrodes of each substrate, an alignment direction of the liquid crystal molecules is changed in accordance with the applied voltage to display images. By controlling the applied voltage, the LCD device provides various transmittances for rays of light to display image data.

Liquid crystal display (LCD) devices have wide application in office automation (OA) and video equipment because of their light weight, thin design, and low power consumption characteristics. Among the different types of LCD devices, active matrix LCDs (AM-LCDs), which have thin film transistors and pixel electrodes arranged in a matrix form, offer high resolution and quick response in displaying moving images. A typical LCD panel has an upper substrate, a lower substrate and a liquid crystal material layer interposed therebetween. The upper substrate, commonly referred to as a color filter substrate, includes a common electrode and color filters. The lower substrate, commonly referred to as an array substrate, includes switching elements, such as thin film transistors (TFT's), and pixel electrodes, for example.

As previously described, operation of an LCD device is based on the principle that the alignment direction of the liquid crystal molecules is dependent upon an applied electric field between the common electrode and the pixel electrode. Accordingly, the liquid crystal molecules function as an optical modulation element having variable optical characteristics that depend upon polarity of the applied voltage.

FIG. 1 is a partially enlarged plan view of an exemplary array substrate according to the related art. As shown in FIG. 1, gate lines 33 are disposed in a transverse direction and data lines 53 are disposed in a longitudinal direction. The data lines 53 perpendicularly cross the gate lines 33 such that the crossings of the gate lines 33 and data lines 53 defines a matrix of pixel regions P. A switching device, such as a thin film transistor T, is disposed in each pixel region P near a crossing of gate and data lines 33 and 53. A gate pad 35 is formed at the end of each gate line 33. A gate pad 35 has a wider width than the gate line 33. A data pad 55 is formed at the end of each data line 53, and similarly has a wider width than the data line 53. On each gate pad 35, a gate pad terminal 71 is formed of a transparent and electrically conductive material. A data pad terminal 73 of transparent conductive material is likewise formed on each data pad 55. The gate pad terminal 71 and the data pad terminal 73 receive electrical signals from external driving circuits.

In each pixel region P, a pixel electrode 69 is disposed so as to come into contact with the thin film transistor T. A storage capacitor C.sub.ST is also formed in a portion of each pixel region P. In each pixel region P in this example, the storage capacitor C.sub.ST is formed over the gate line 33 and is connected in parallel with the pixel electrode 69.

Each thin film transistor T includes a gate electrode 31 extending from the gate line 33, an active layer 39 formed of silicon, a source electrode 49 extending from the data line 53, and a drain electrode 51 contacting the pixel electrode 69. Meanwhile, the storage capacitor C.sub.ST includes the portion of the gate line 33 as a first electrode, a capacitor electrode 57 as a second electrode, and an insulator (not shown) interposed therebetween. The capacitor electrode 57 is formed of the same material as the source electrode 49 and drain electrode 51, and communicates with the pixel electrode 69 through a storage contact hole 63.

In the related art shown in FIG. 1, the gate electrode 31 and the gate line 33 are generally formed of aluminum or aluminum alloy to prevent signal delay. Further, all of the source electrode 49, the drain electrode 51, the data line 53 and the data pad 55 can also be formed of aluminum or aluminum alloy. Alternatively, such electrodes and the data line can be formed of aluminum-included double layers that can be formed of an aluminum (or aluminum-alloy) layer and an additional metal layer because the aluminum or aluminum alloy are chemically weak to etchant and developer used during the fabrication process.

Now with reference to FIGS. 2A-2F, 3A-3F and 4A-4F, fabrication process steps for forming an array substrate will be explained in detail according to the related art. FIGS. 2A-2F are cross-sectional views along II-III' of FIG. 1 showing exemplary fabrication process steps for a thin film transistor and a pixel electrode according to the related art. FIGS. 3A-3F are cross sectional views along III-III' of FIG. 1 showing exemplary fabrication process steps for a gate pad according to the related art. FIGS. 4A-4F are cross sectional views along IV-IV' of FIG. 1 showing exemplary fabrication process steps for a data pad according to the related art.

In FIGS. 2A, 3A, and 4A, a first metal layer can be deposited onto a surface of a substrate 21, and then patterned to form a gate line 33, a gate electrode 31, and a gate pad 35 on the substrate 21. As mentioned before, the gate pad 35 can be disposed at the end of the gate line 33, and the gate electrode 31 can extend from the gate line 33. The first metal layer may be aluminum-based material(s), for example, aluminum (Al) or aluminum neodymium (AlNd), having low electrical resistance to prevent signal delay. The aluminum in the gate line 33 reduces the RC delay because it has low resistance. Although the aluminum-based material, aluminum (Al) or aluminum-alloy (e.g., aluminum neodymium (AlNd)), has low electrical resistance, it is chemically weak against developer and etchant. In particular, aluminum is reactive to acidity and susceptible to developing hillocks during a high temperature manufacturing or patterning process, possibly resulting in line defects.

As shown in FIGS. 2B, 3B and 4B, a gate insulation layer 37 (or a first insulating layer) may be formed over the substrate 21 after formation of the gate electrode 31, the gate line 33 and the gate pad 35. The gate insulation layer 37 fully covers the gate electrode 31, the gate line 33 and the gate pad 35. The gate insulation layer 37 can include inorganic material(s), for example, silicon nitride (SiN.sub.x) and silicon oxide (SiO.sub.2). Then, an intrinsic amorphous silicon layer (e.g., a-Si:H) and a doped amorphous silicon layer (e.g., n+a-Si:H) can be sequentially deposited on an entire surface of the gate insulation layer 37, and can be simultaneously patterned using a mask process to form an active layer 39 and an ohmic contact layer 41. The ohmic contact layer 41 can be positioned on the active layer 39 over the gate electrode 31.

Next, as shown in FIGS. 2C, 3C and 4C, second to fourth metal layers 43, 45 and 47 are sequentially formed on the gate insulation layer 37 to cover both the active layer 39 and the ohmic contact layer 41. Here, the second and fourth metal layers 43 and 47 are molybdenum (Mo), and the third metal layer 45 interposed therebetween is aluminum (Al). Therefore, the triple-layered structure of Mo/Al/Mo is disposed on the gate insulation layer 37.

Thereafter, the second to fourth metal layers 43, 45 and 47 are simultaneously patterned as shown in FIGS. 2D, 3D and 4D. Thus, a source electrode 49, a drain electrode 51, a data line 53, a data pad 55 and a capacitor electrode 57, all of which have the triple-layered structure, are formed over the substrate 21. The source electrode 49 extends from the data line 53 and contacts one portion of the ohmic contact layer 41. The drain electrode 51 is spaced apart from the source electrode 49 across the gate electrode 31, and contacts the other portion of the ohmic contact layer 41. As mentioned with reference to FIG. 1, the data pad 55 is at the end of the data line 53, and the capacitor electrode 57 is shaped like an island and disposed above the gate line 33. After forming the source and drain electrodes 49 and 51, a portion of the ohmic contact layer 41 located between the source electrode 49 and drain electrode 51 is removed to form a channel region. At this time of forming the channel region, the source electrode 49 and drain electrode 51 serve as masks.

Meanwhile, the source electrode 49, drain electrode 51 and the data line 53 can be formed of a single layer of molybdenum or chromium. However, doing so may result in signal delay in those electrodes and data line such that it is hard to obtain uniform image quality across the entire liquid crystal panel. Especially, if the liquid crystal panel is very large in size, signal delay becomes very serious and difficult to overcome.

In contrast, when the source electrode 49, and drain electrode 51 and the data line 53 include metal having a low resistance, such as aluminum, the electrical signals flow without signal delay such that a large size array substrate can be fabricated. Therefore, the source electrode 49, and drain electrode 51 and the data lines 53 herein include an aluminum layer therein. Further, molybdenum layers are formed on both upper and lower surfaces of the aluminum layer when aluminum is used for the source electrode 49 and the drain electrode 51. The molybdenum formed underneath the aluminum layer acts to prevent a spiking phenomenon in which the aluminum layer penetrates into the active layer 39 or the ohmic contact layer 41. The molybdenum formed on top of the aluminum layer acts to reduce contact resistance between the aluminum layer and a later-formed transparent electrode. For these reasons, the source electrode 49, the drain electrode 51 and the data line 53 are formed to have a triple-layered structure of Mo/Al/Mo.

As shown in FIGS. 2E, 3E and 4E, a passivation layer 59, which is a second insulating material, is formed all over the substrate 21 to cover the source and drain electrodes 49 and 51, the data line 53, the data pad 55 and the storage capacitor 57. Thereafter, the passivation layer 59 is patterned to form a drain contact hole 61, a storage contact hole 63, a gate pad contact hole 65, and a data pad contact hole 67. The drain contact hole 61 exposes a portion of the triple-layered drain electrode 51, the storage contact hole 63 exposes a portion of the triple-layered capacitor electrode 57, the gate pad contact hole 65 exposes a portion of the triple-layered gate pad 35, and the data pad contact hole 67 exposes a portion of the triple-layered data pad 55.

As shown in FIGS. 2F, 3F and 4F, a transparent conductive material is deposited on the passivation layer 59 having the above-mentioned holes, and then this transparent conductive material is patterned to form a pixel electrode 69, a gate pad terminal 71 and a data pad terminal 73. The transparent conductive material is one of indium tin oxide (ITO) and indium zinc oxide (IZO). The pixel electrode 69 contacts the drain electrode 51 and the capacitor electrode 57, respectively, through the drain contact hole 61 and storage contact hole 63. Further, the gate pad terminal 71 contacts the gate pad 35 through the gate pad contact hole 65, and the data pad terminal 73 contacts the data pad 55 through the data pad contact hole 67. Accordingly, the array substrate of the related art is complete.

In the related art shown in FIGS. 2A-2F, 3A-3F and 4A-4F, the source electrode 49, the drain electrode 51, the data line 53 and the data pad 55, all have the triple-layered structure and are formed with an etching solution that simultaneously etches aluminum and molybdenum. Thus, an electrochemical reaction, such as a galvanic reaction, will be generated by the etching solution during this etching process. As the molybdenum layer becomes thicker, it is more difficult to overcome the problem of electrochemical reaction. During the etching process of the molybdenum layers disposed on the upper and lower surfaces of the aluminum layer are overly etched. Especially, if the layer of molybdenum underlying the layer of aluminum is overly etched, the aluminum layer collapses and contacts the active layer of the thin film transistor when the passivation layer is formed over them. The collapse and contact are caused by the pressure of the overlying passivation layer during the formation of the passivation layer. The connection between the aluminum layer and the active layer will raise the leakage current and deteriorate the operating characteristics of the thin film transistor.

FIG. 5 is an enlarged cross-sectional view of a portion A in FIG. 2F and illustrates overetching in both the upper and lower metal layers of the drain electrode. As shown in portion E of FIG. 5, the molybdenum layers 43 and 47 are etched more than the aluminum layer 45. This phenomenon of overetching also occurs in the source electrode 51, the data line 53 and the data pad 55. The overetching of the molybdenum layers 43 and 47 causes the passivation layer 59 to not form properly over the substrate 21. Further, the overetching of the molybdenum layer 43 causes the aluminum layer 45 to contact the active layer 39 and/or the ohmic contact layer 41 because the aluminum layer 45 is pressed by the passivation layer 59, thereby increasing the leakage current in the thin film transistor. The increase of the OFF current deteriorates the electrical characteristics of the thin film transistor.

SUMMARY OF THE INVENTION

Accordingly, the present invention is directed to an array substrate for a liquid crystal display (LCD) device, that substantially obviates one or more of problems due to limitations and disadvantages of the related art.

An advantage of the present invention is to provide an array substrate for use in a liquid crystal display device, which has a reduced leakage current in thin film transistors.

Another advantage of the present invention is to provide a method of forming an array substrate for use in a liquid crystal display device, which simplifies and stabilizes the manufacturing process and increases the manufacturing yield.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an array substrate for use in a liquid crystal display device includes a gate electrode, a gate line and a gate pad on a substrate, wherein the gate electrode, the gate line and the gate pad have a double-layered structure including a first metal layer and a first barrier metal layer in series from the substrate, and wherein the first metal is one of aluminum and aluminum alloy; a gate insulation layer on the substrate covering the gate electrode, gate line and gate pad; an active layer and an ohmic contact layer sequentially formed on the gate insulation layer and over the gate electrode; a data line on the gate insulation layer perpendicularly crossing the gate line, source and drain electrodes contacting the ohmic contact layer, and a data pad on the gate insulation layer, wherein the data line, the source and drain electrode and the data pad have a double-layered structure consisting of a second barrier metal layer and a second metal layer of copper; a passivation layer formed on the gate insulation layer to cover the data line, source and drain electrodes, and data pad, wherein the passivation layer has a drain contact hole exposing a portion of the drain electrode, a gate pad contact hole exposing a portion of the gate pad, and a data pad contact hole exposing a portion of the data pad; and a pixel electrode, a gate pad terminal and a data pad terminal on the passivation layer, all of which are formed of a transparent conductive material on the passivation layer.

In another aspect, a method of forming an array substrate for use in a liquid crystal display device includes: forming a first metal layer and a first barrier metal layer in series on a substrate, wherein the first metal layer is one of aluminum and aluminum alloy; patterning simultaneously both the first metal layer and the first barrier metal layer using a first mask process to form a gate electrode, a gate line and a gate pad on the substrate, wherein the gate electrode, the gate line and the gate pad have a double-layered structure consisting of the metal layer and the first barrier metal layer; forming a gate insulation layer on the substrate to cover the double-layered gate electrode, line and pad; forming an active layer and an ohmic contact layer sequentially on the gate insulation layer using a second mask process; forming sequentially a second barrier metal layer and a second metal layer of copper on the gate insulation layer to cover the active layer and the ohmic contact layer; patterning simultaneously both the second barrier metal layer and the second metal layer of copper using a third mask process to form a data line, source and drain electrodes and a data pad, wherein the data line is on the gate insulation layer and crossed the gate line, and wherein the data line, the source and drain electrodes, the capacitor electrode and the data pad have a double-layered structure including the second barrier metal layer and the second metal layer of copper; forming a passivation layer formed on the gate insulation layer to cover the double-layered data line, source and drain electrodes, and data pad; patterning the second passivation layer using a fourth mask process to form a drain contact hole exposing the drain electrode, a gate pad contact hole exposing the gate pad, and a data pad contact hole exposing the data pad; and forming a pixel electrode, a gate pad terminal and a data pad terminal on the passivation layer using a fifth mask process.

In another aspect, a method of forming an array substrate for use in a liquid crystal display device includes: forming a first metal layer and a first barrier metal layer in series on a substrate, wherein the first metal layer is one of aluminum and aluminum alloy; patterning simultaneously both the first metal layer and the first barrier metal layer using a first mask process to form a gate electrode, a gate line and a gate pad on the substrate, wherein the gate electrode, the gate line and the gate pad have a double-layered structure including the metal layer and the first barrier metal layer; forming a gate insulation layer on the substrate to cover the double-layered gate electrode, line and pad; forming sequentially a pure amorphous silicon layer, a doped amorphous silicon layer, a second barrier layer and a second metal layer of copper on the gate insulation layer; patterning simultaneously the pure and doped amorphous silicon layers and the second barrier and second metal layers using a second mask process to form a data line, source and drain electrodes, a data pad, and silicon patterns, wherein the data line is on the gate insulation layer and crossed the gate line, wherein the data line, the source and drain electrodes, the capacitor electrode and the data pad have a double-layered structure consisting of the second barrier metal layer and the second metal layer of copper, and wherein the silicon patterns consist of a first layer of pure amorphous silicon and a second layer of doped amorphous silicon and are disposed underneath the data line, the data pad, and the source and drain electrodes; forming a passivation layer formed on the gate insulation layer to cover the double-layered data line, source and drain electrodes, and data pad; patterning the second passivation layer using a third mask process to form a drain contact hole exposing the drain electrode, a gate pad contact hole exposing the gate pad, and a data pad contact hole exposing the data pad; and forming a pixel electrode, a gate pad terminal and a data pad terminal on the passivation layer using a fourth mask process.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the illustrated embodiments of the present invention, examples of which are illustrated in the accompanying drawings. Wherever possible, similar reference numbers will be used throughout the drawings to refer to the same or like parts.

Figure 1:
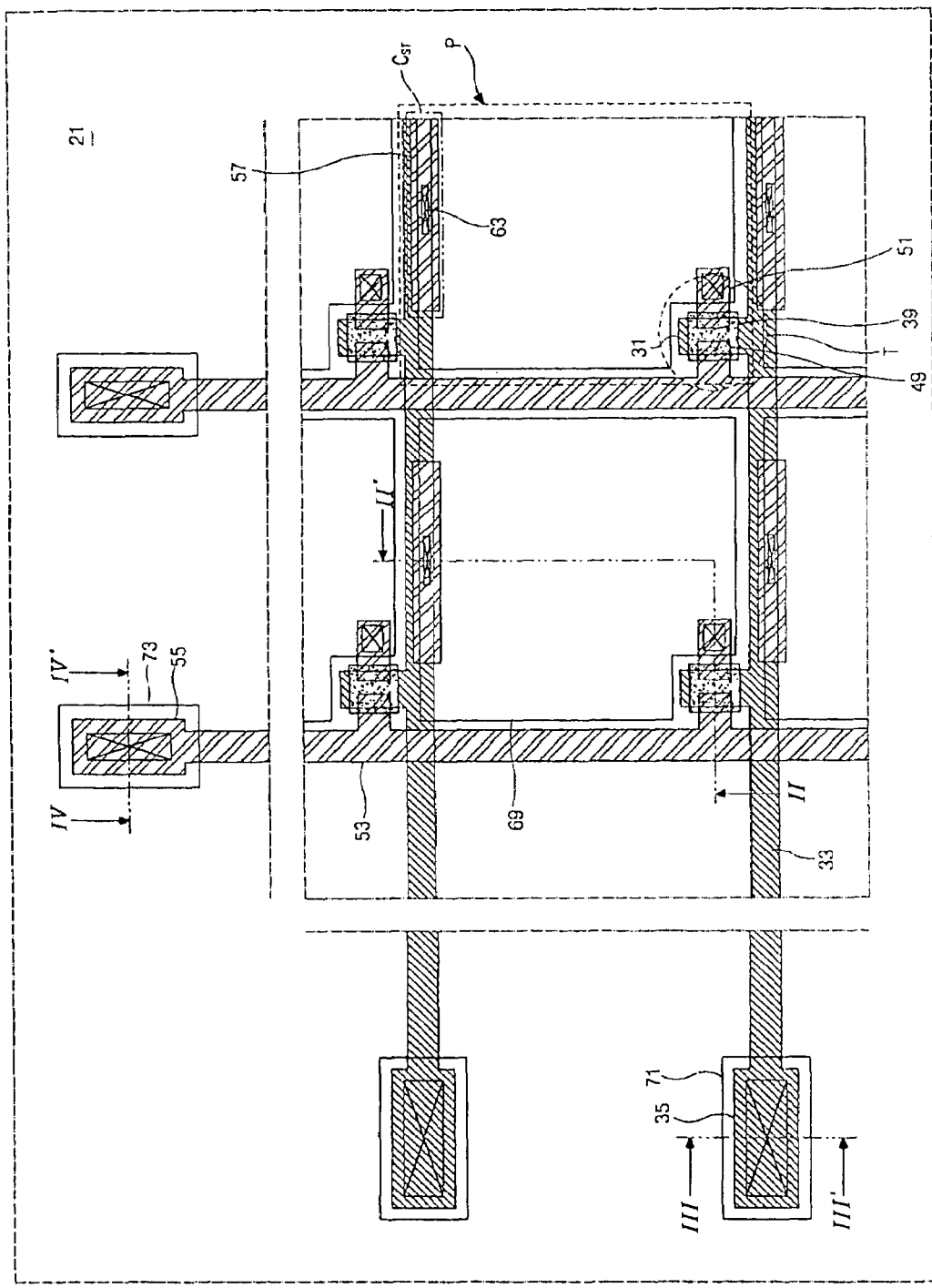
FIG. 1 is a partially enlarged plan view of an exemplary array substrate according to the related art.
Figure 2A:
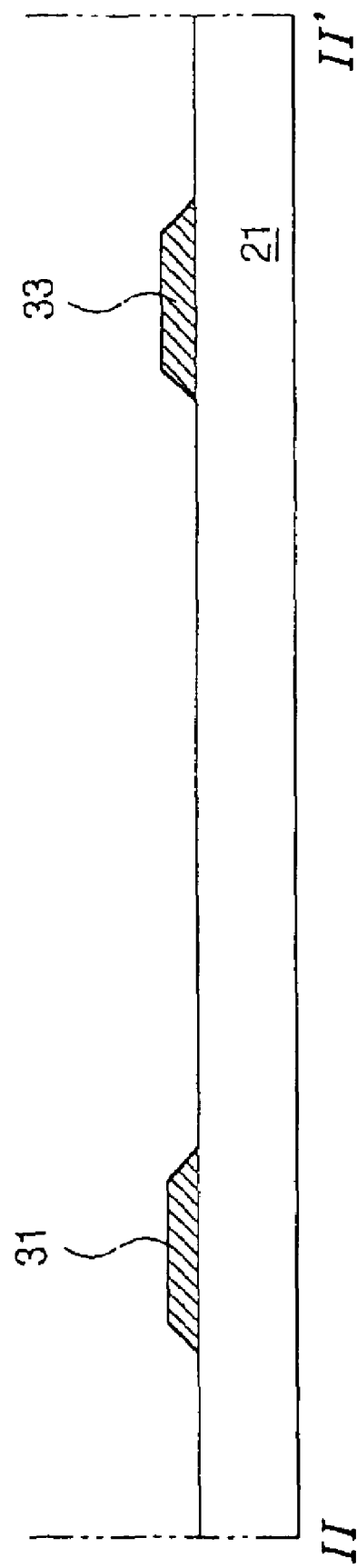
FIGS. 2A-2F are cross-sectional views along II-II' of FIG. 1 of exemplary fabrication process steps for a thin film transistor and a pixel electrode according to the related art.
Figure 2B:
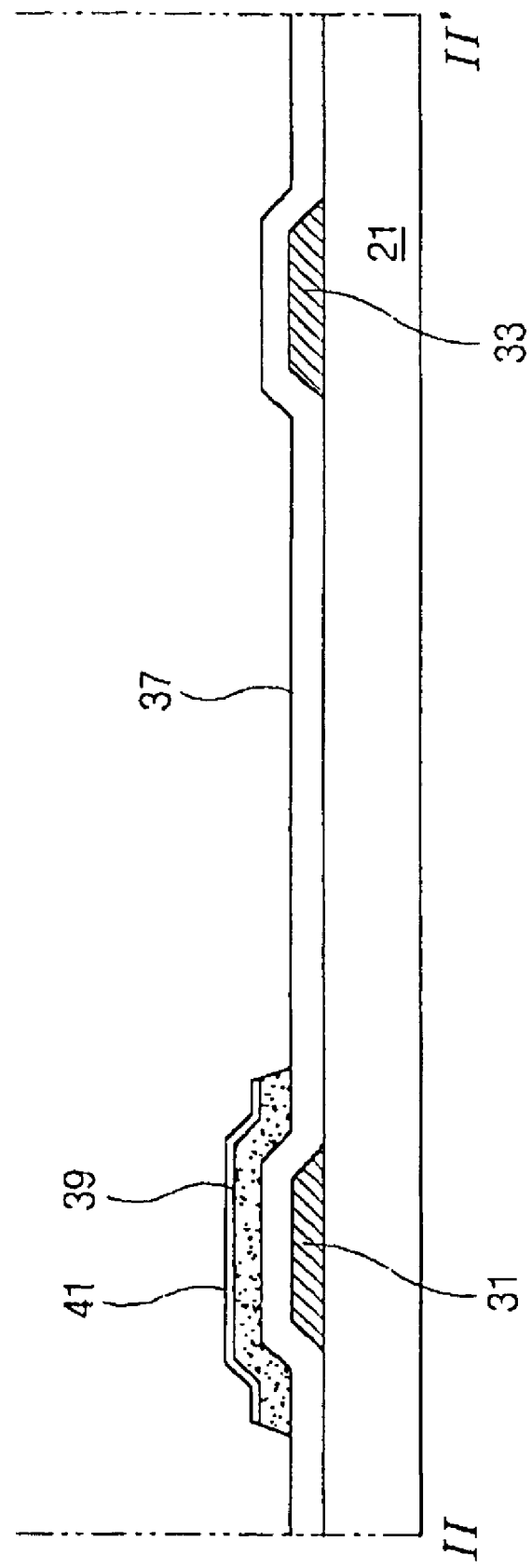
Figure 2C:
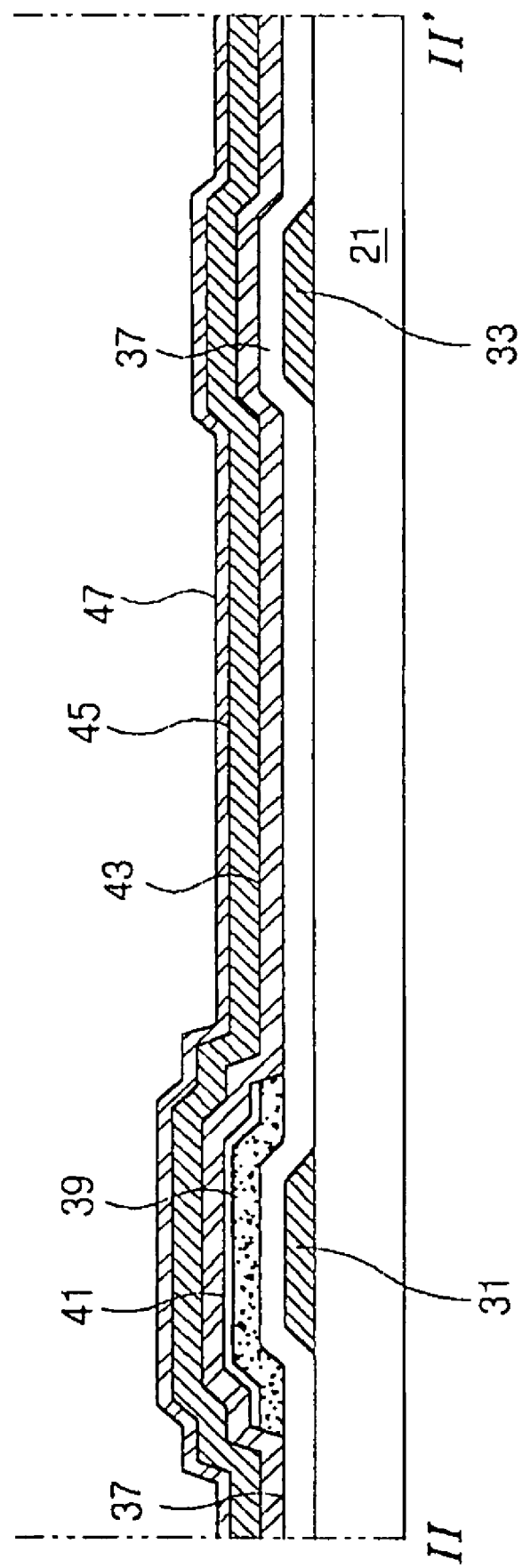
Figure 2D:
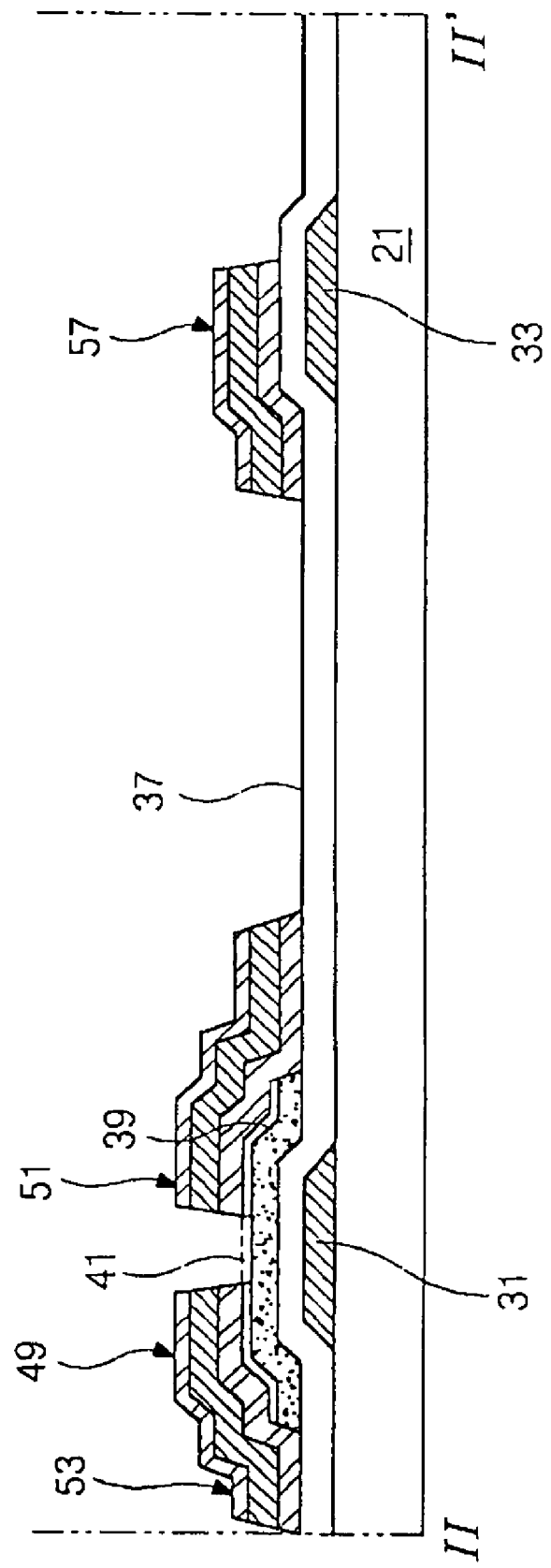
Figure 2E:
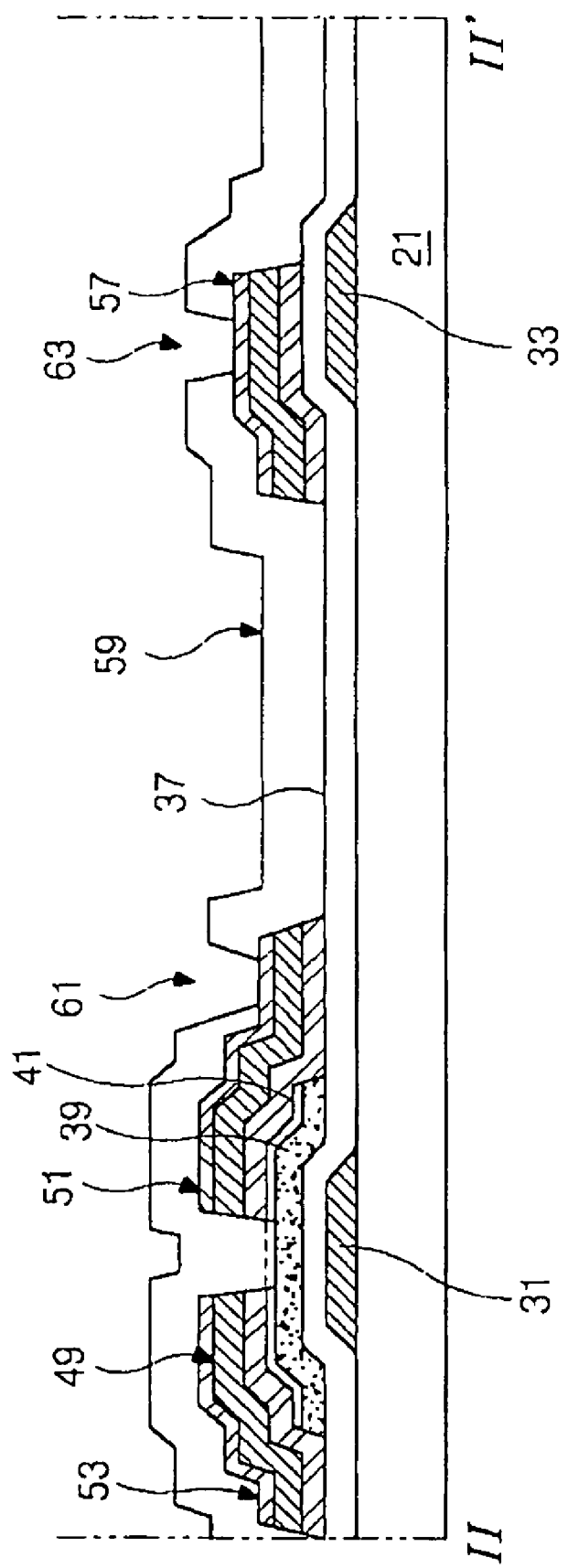
Figure 2F:
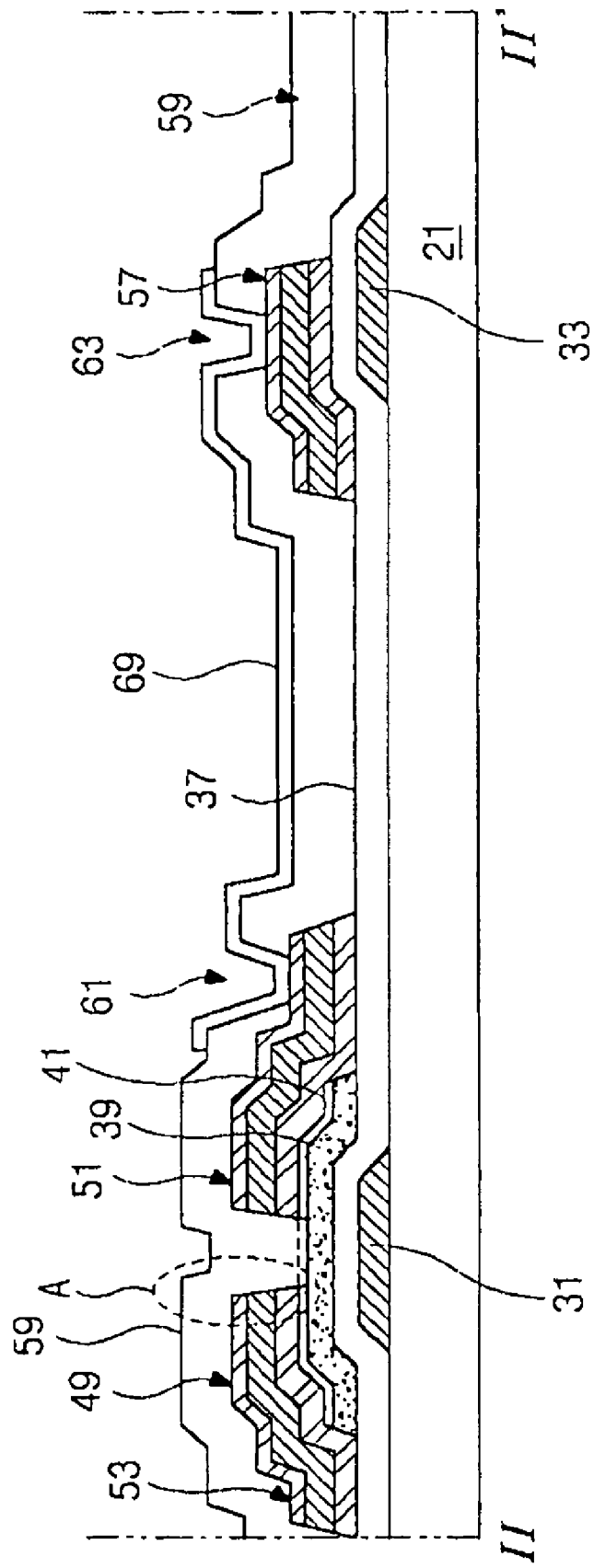
Figure 3A:
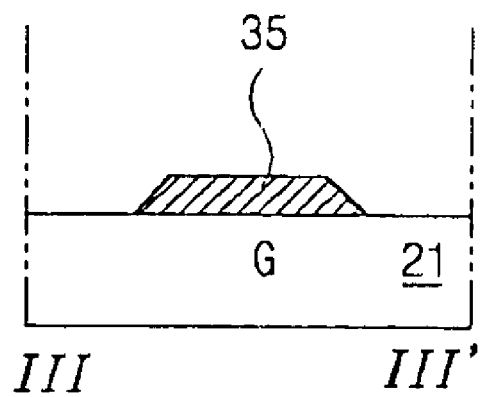
FIGS. 3A-3F are cross sectional views along II-III' of FIG. 1 of exemplary fabrication process steps for a gate pad according to the related art.
Figure 3B:
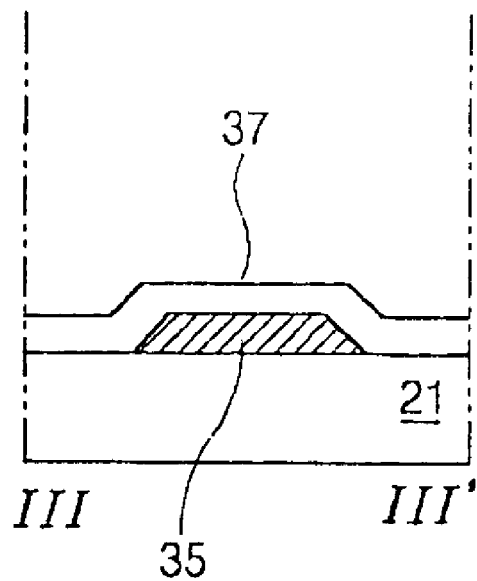
Figure 3C:
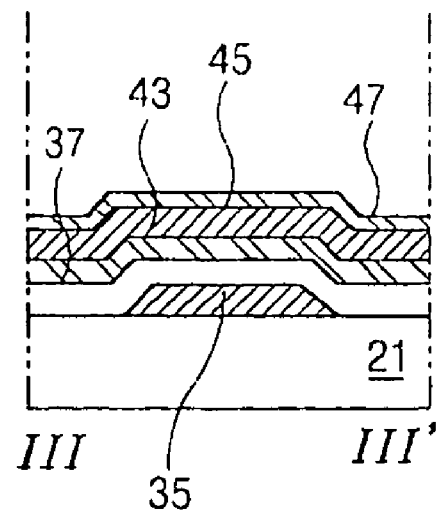
Figure 3D:
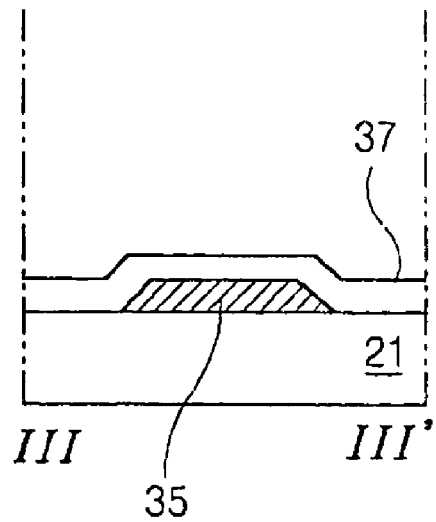
Figure 3E:
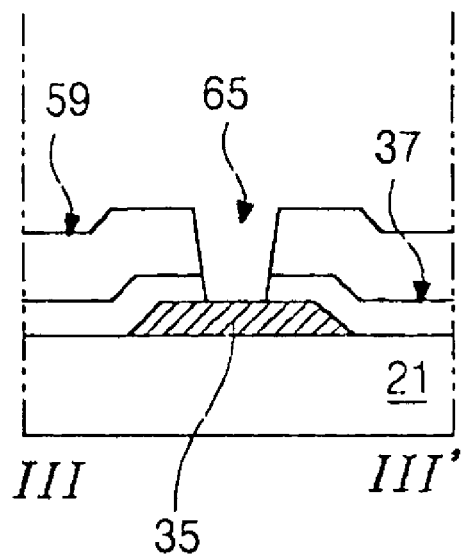
Figure 3F:
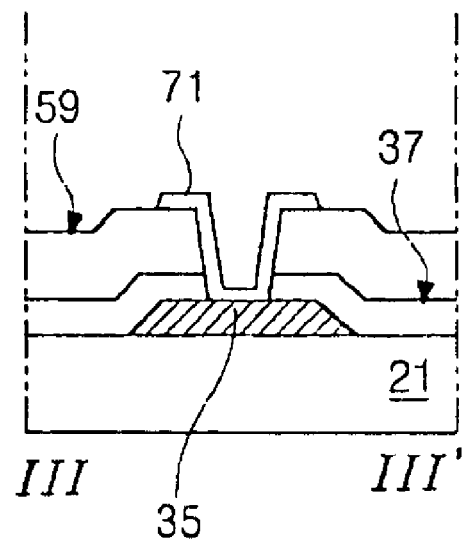
Figure 4A:
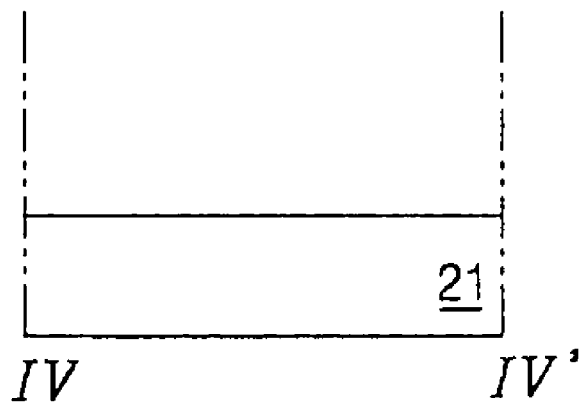
FIGS. 4A-4F are cross sectional views along IV-IV' of FIG. 1 of exemplary fabrication process steps for a data pad according to the related art.
Figure 4B:
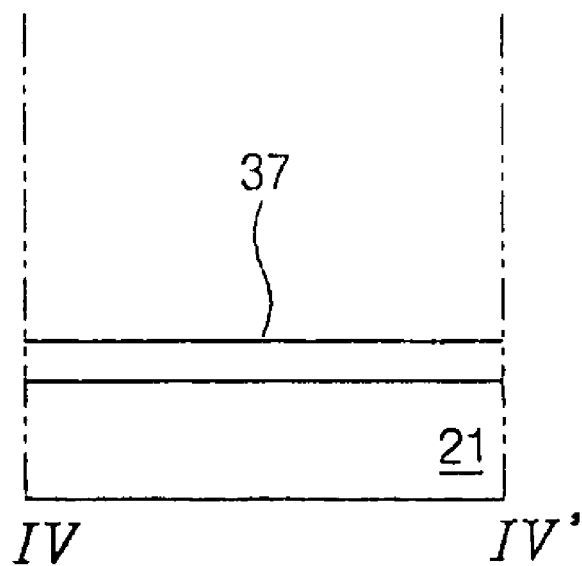
Figure 4C:
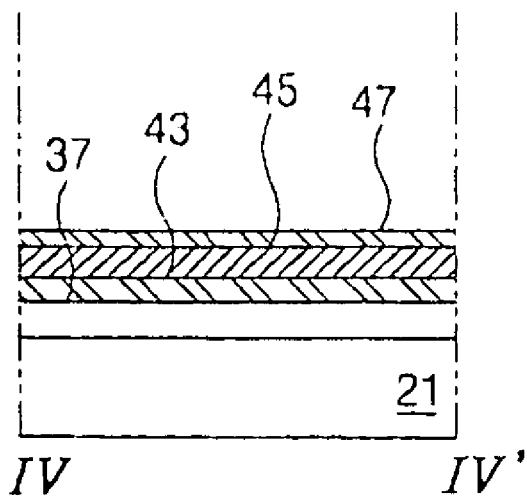
Figure 4D:
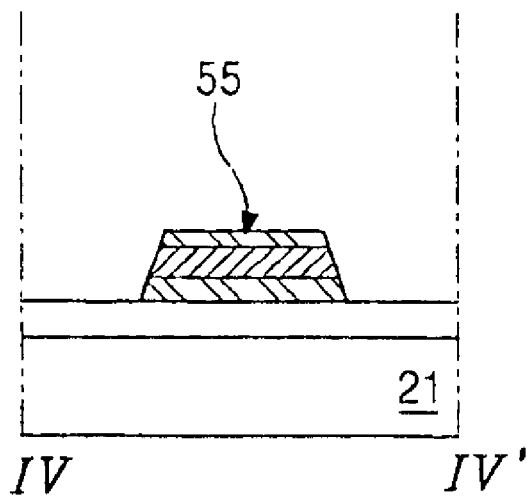
Figure 4E:
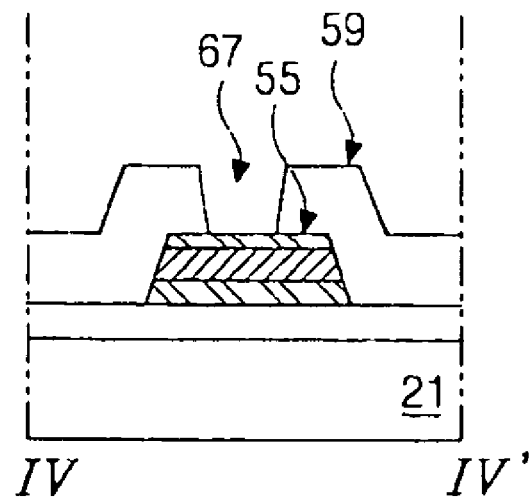
Figure 4F:
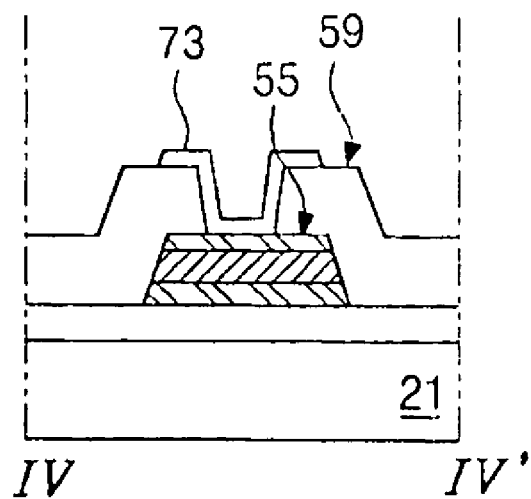
Figure 5:
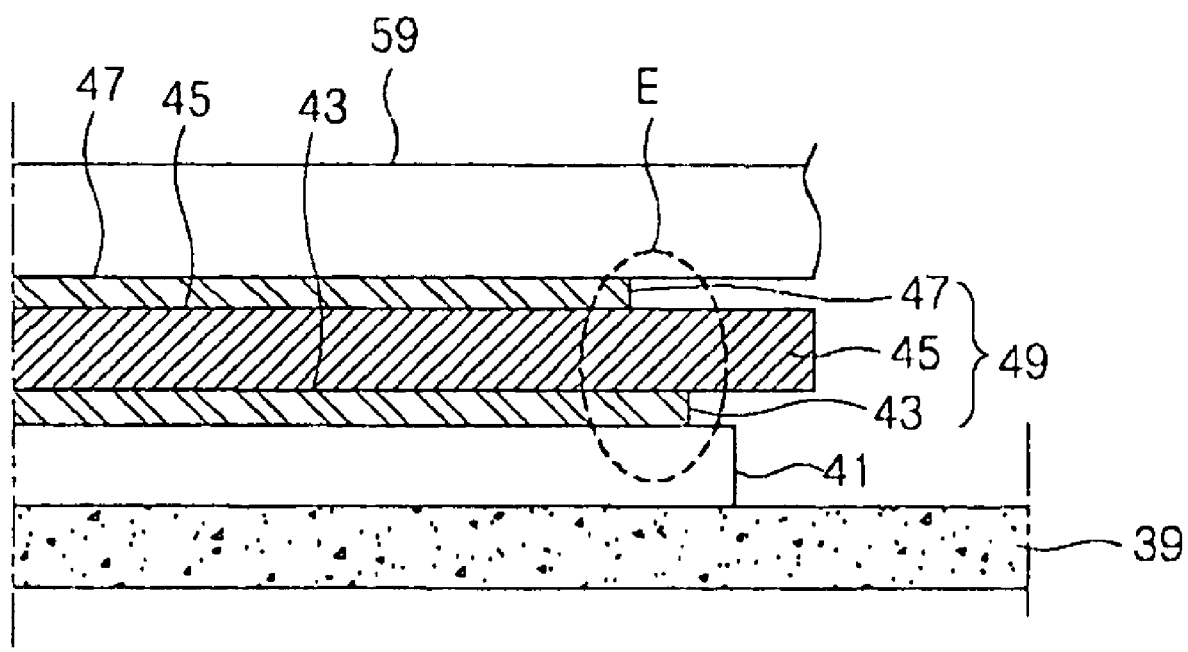
FIG. 5 is an enlarged cross-sectional view of a portion A of FIG. 2F and illustrates overetching in both the upper and lower metal layers of the drain electrode.

FIGS. 6A to 6I are cross sectional views illustrating a process for forming a pixel according to a first embodiment of the present invention, FIGS. 7A to 7I are cross sectional views illustrating a process for forming a gate pad according to the first embodiment of the present invention, and FIGS. 8A to 8I are cross sectional views illustrating a process for forming a data pad according to the first embodiment of the present invention. In this embodiment of the present invention, it is distinguishable that gate, source and drain electrodes and gate and data lines are double layers including a barrier layer, and the array substrate is fabricated through a five-mask process. Furthermore, the plan view of the present invention is similar to that of FIG. 1, so such a separate plan view is not included.

Figure 6A:
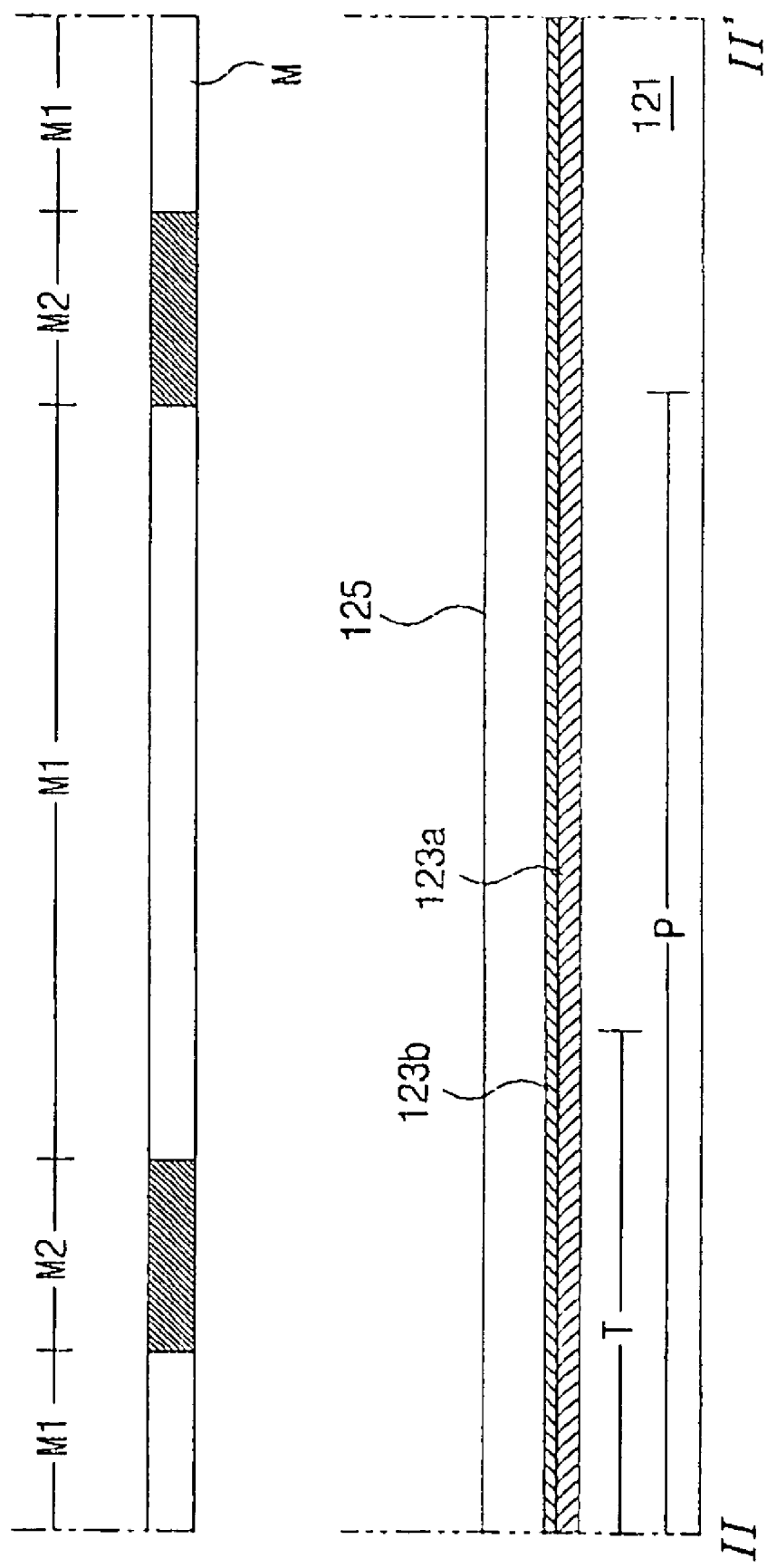
FIGS. 6A to 6I are cross sectional views illustrating a process for forming a pixel according to a first embodiment of the present invention.
Figure 7A:
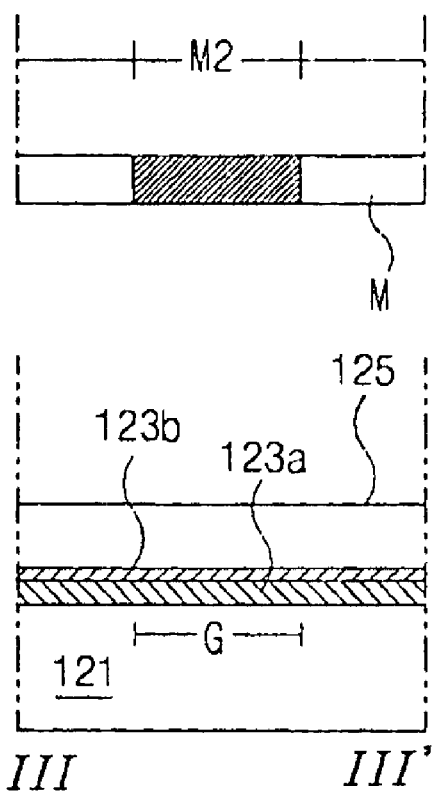
FIGS. 7A to 7I are cross sectional views illustrating a process for forming a gate pad according to the first embodiment of the present invention.
Figure 8A:
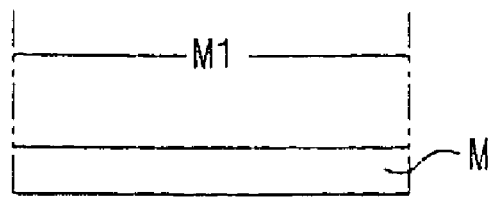
FIGS. 8A to 8I are cross sectional views illustrating a process for forming a data pad according to the first embodiment of the present invention.
Figure 8A:
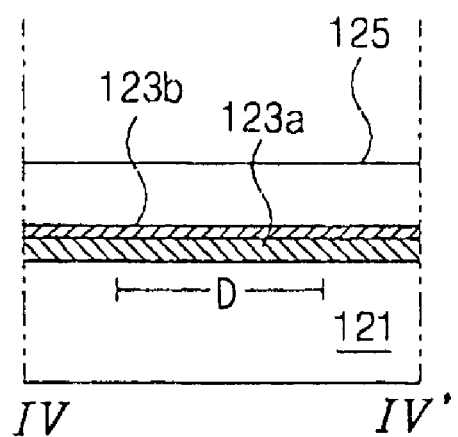

Referring to FIGS. 6A, 7A and 8A, provided in a substrate 121 a TFT region T, a pixel region P, a gate pad region G and a data pad region D. Thereafter, a first metal layer 123a is formed on the substrate 121 and then a second metal layer 123b is formed on the first metal layer 123a. In this embodiment of the present invention, the first metal layer 123a may be aluminum (Al) or aluminum alloy (Al-alloy), and the second metal layer 123b may be one of tantalum (Ta), titanium (Ti), molybdenum (Mo), molybdenum alloy (Mo-alloy), chromium (Cr), tantalum nitride (TaN), titanium nitride (TiN), tungsten (W), nickel (Ni), indium (In), tin (Sn), gold (Au), and an alloy thereof. The second metal layer 123b acts as a barrier metal that protects the first metal layer 123a. Although the first metal layer 123a of aluminum (Al) or aluminum alloy (Al-alloy) has a low electrical resistance, the aluminum (Al) or aluminum alloy (Al-alloy) layer 123a reacts with the etchant or developer during the process. Thus, the barrier metal 123b overlaps the first metal layer 123a. Thereafter, a photoresist layer 125 is formed on the second metal layer 123b. After forming the photoresist layer 125, a mask M having light-transmitting portions M1 and light-shielding portions M2 is disposed over the photoresist 125, and then a light exposure is performed to the photoresist 125. As explained above, the photoresist 125 is a positive type in that a portion exposed by light is removed by the developing process.

Figure 6B:
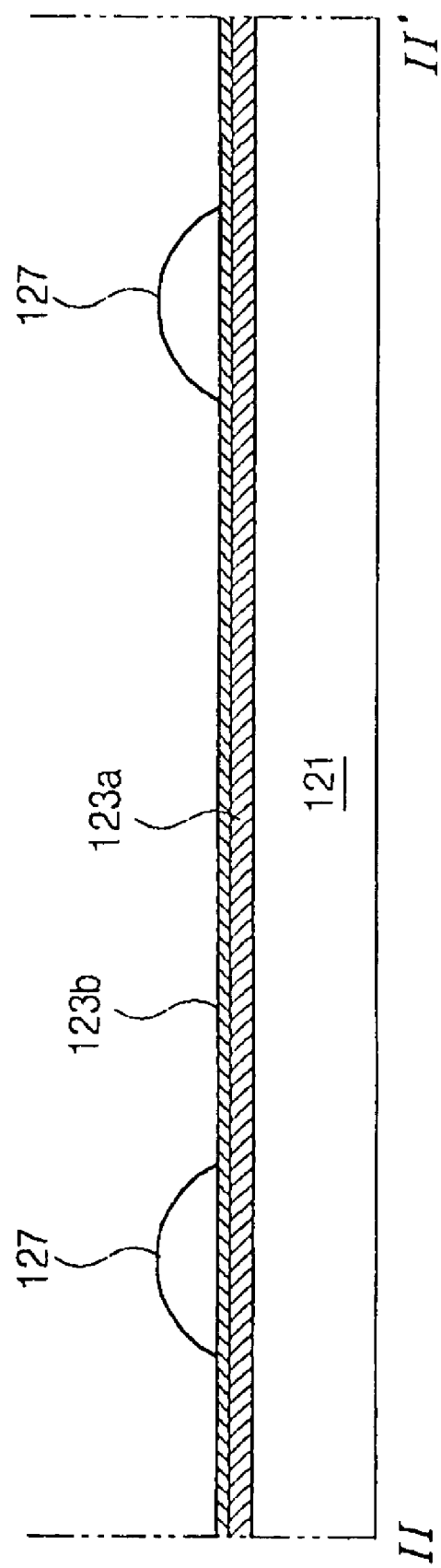
Figure 7B:
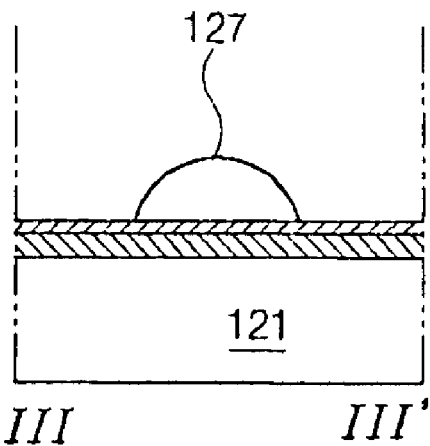
Figure 8B:
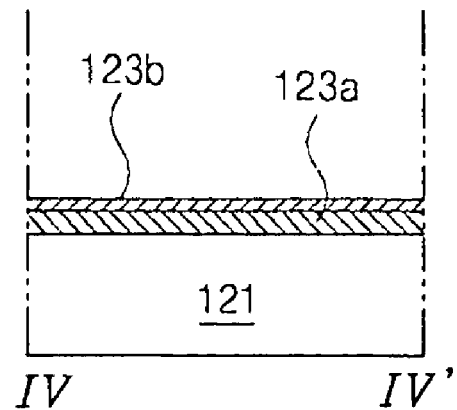

In FIGS. 6B, 7B and 8B, after developing the photoresist 125, photoresist patterns 127 remain on the second metal layer 123b. Since the photoresist 125 is a positive type, the remaining photoresist pattern 127 corresponds to the light-shielding portions M2 of the mask M. After the development, portions of the second metal layer 123b are exposed. Thereafter, the substrate 121 having the photoresist patterns 127 is baked in an oven such that the photoresist patterns 127 have a semicircular shape as shown in FIGS. 6B and 7B.

Figure 6C:
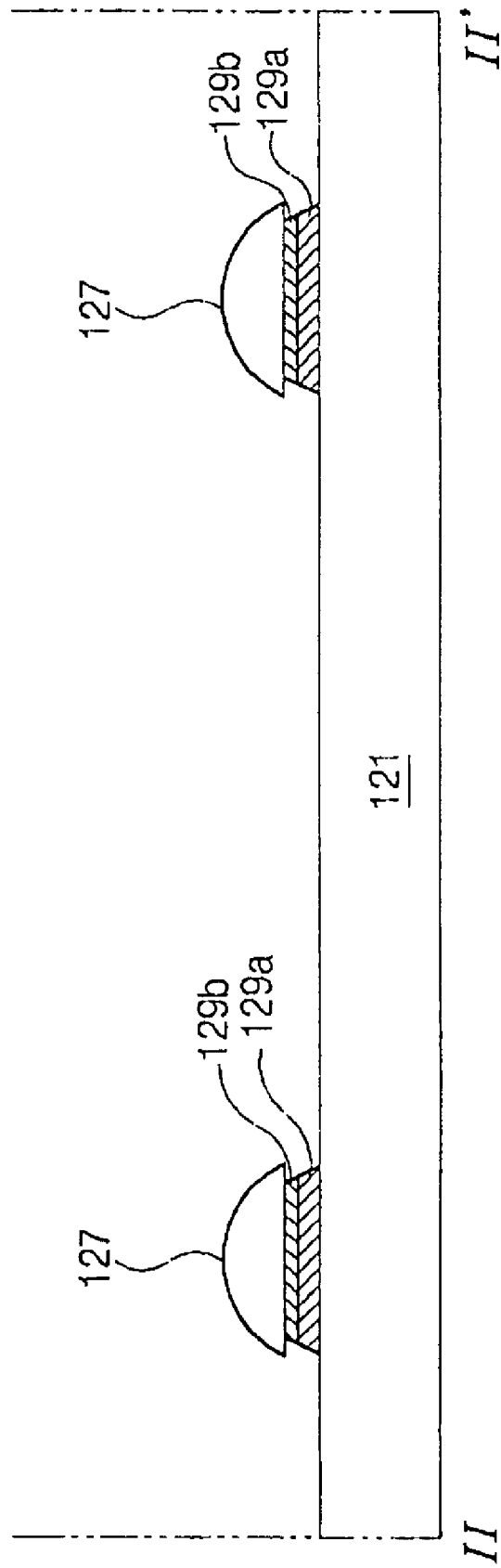
Figure 7C:
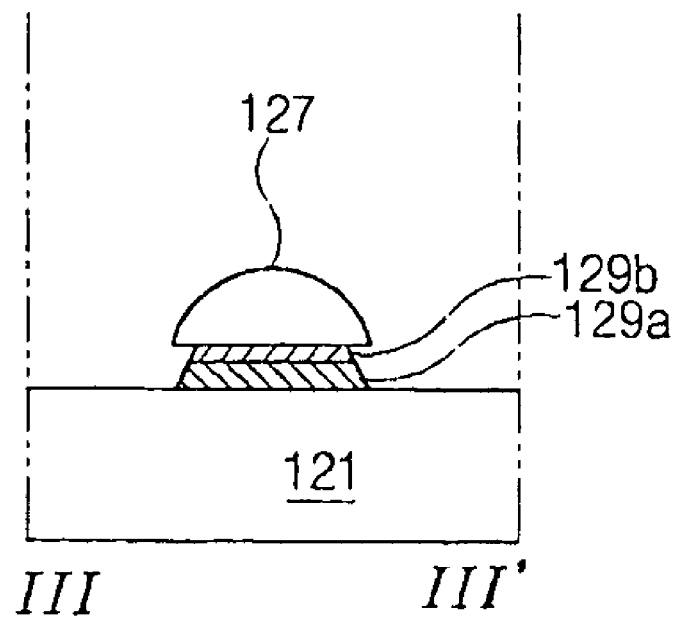
Figure 8C:
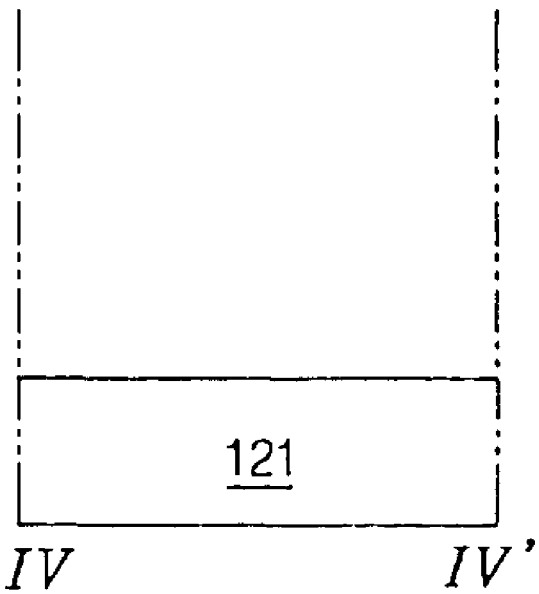

Now referring to FIGS. 6C, 7C and 8C, the exposed portions of the second metal layer 123b and the underlying first metal layer 123a are patterned through an etching process. Therefore, first and second metal patterns 129a and 129b are formed underneath the photoresist patterns 127. The first and second metal patterns 129a and 129b have a smooth tapered shape without any steps on their sides.

Figure 6D:
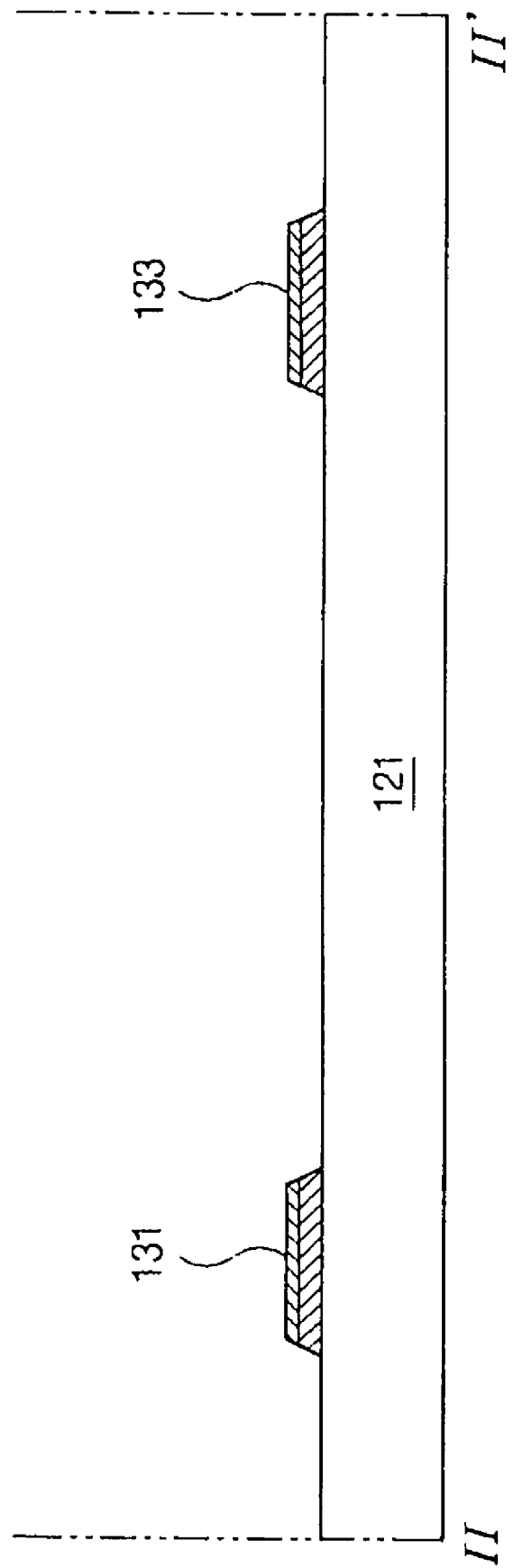
Figure 7D:
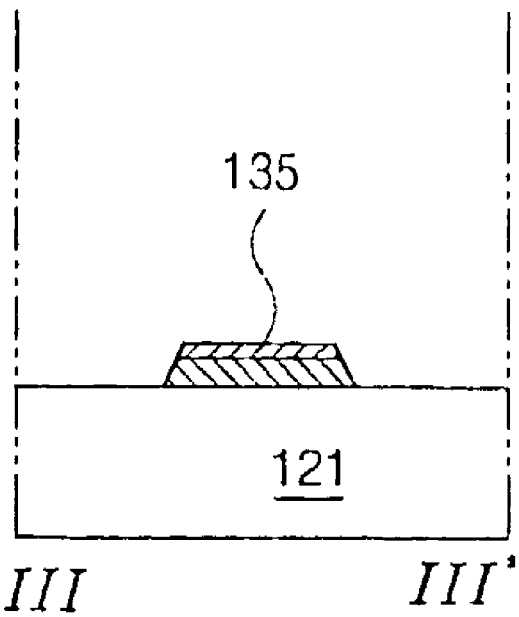
Figure 8D:
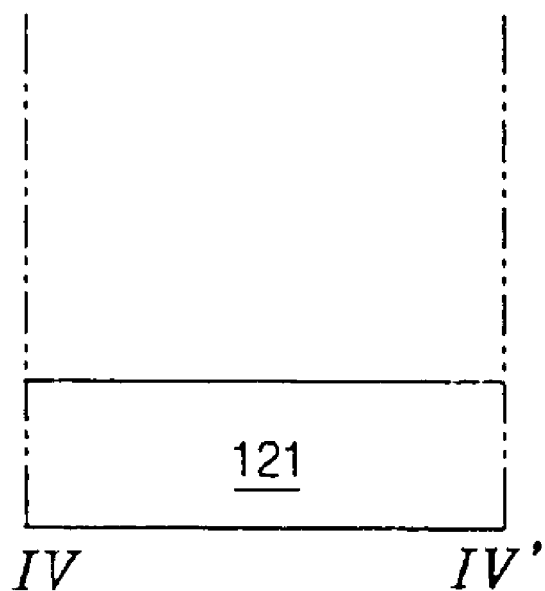

After the etch process, the photoresist patterns 127 are stripped away as shown in FIGS. 6D, 7D and 8D. Therefore, a gate electrode 131, a gate line 133 and a data pad 135 are formed to have a double-layered structure consisting of aluminum (or aluminum alloy) and one of tantalum (Ta), titanium (Ti), molybdenum (Mo), molybdenum alloy (Mo-alloy), chromium (Cr), tantalum nitride (TaN), titanium nitride (TiN), tungsten (W), nickel (Ni), indium (In), tin (Sn), gold (Au), and an alloy thereof. As described hereinbefore, the gate electrode 131 extends from the gate line 133, and the gate pad 135 is at the end of the gate line 133.

Figure 6E:
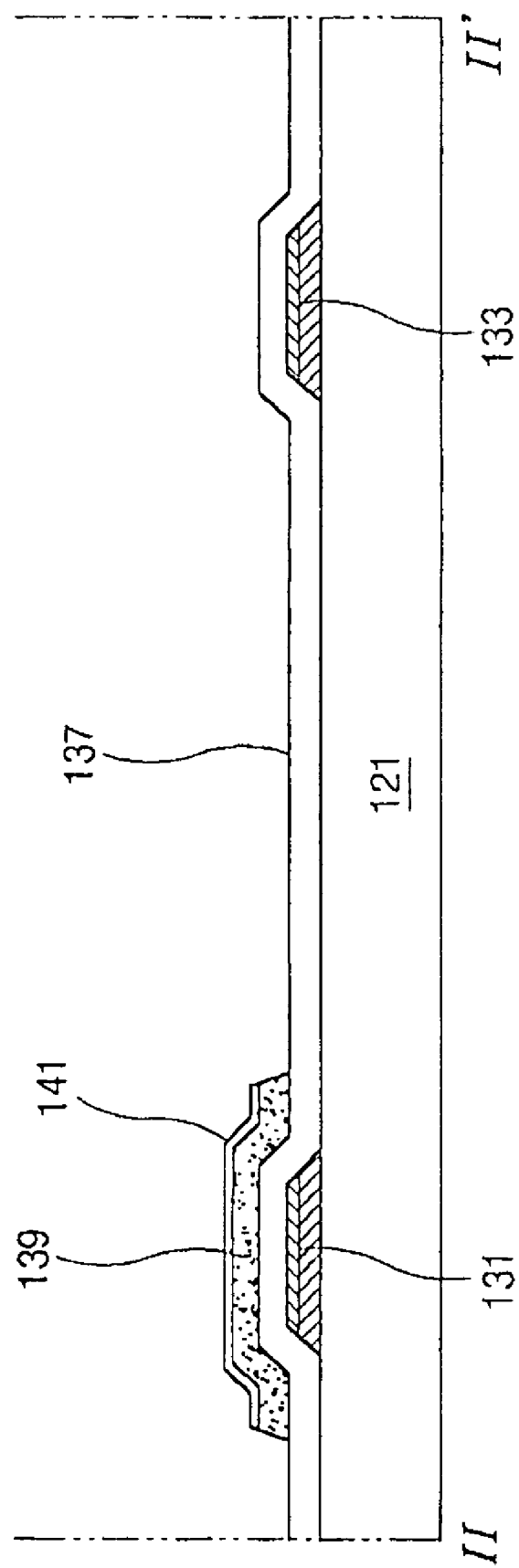
Figure 7E:
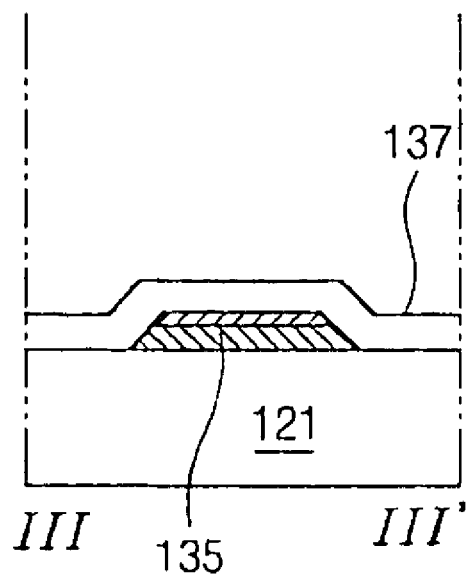
Figure 8E:
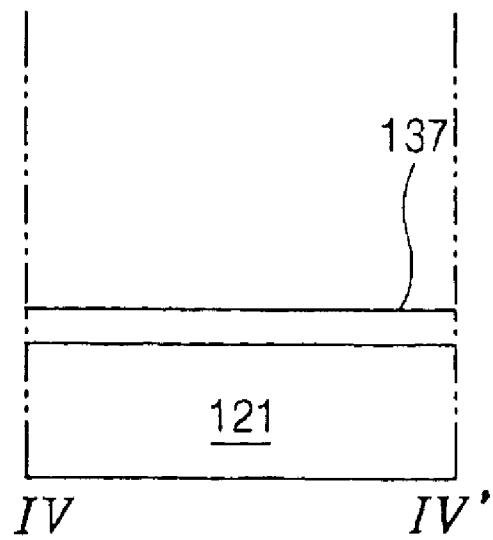

A second mask process will be explained with reference to FIGS. 6E, 7E and 8E. As shown, a gate insulation layer 137 is formed on the substrate 121 to cover the double-layered gate electrode 131, line 133 and pad 135. The gate insulation layer 137 is an inorganic material, such as silicon nitride (SiN.sub.x) or silicon oxide (SiO.sub.2). Thereafter, amorphous silicon (a-Si:H) and n.sup.+doped amorphous silicon (n.sup.+a-Si:H) are sequentially formed on the gate insulation layer 137 and then patterned throughout the second mask process to form an active layer 139 and an ohmic contact layer 141 over the gate electrode 131.

Figure 6F:
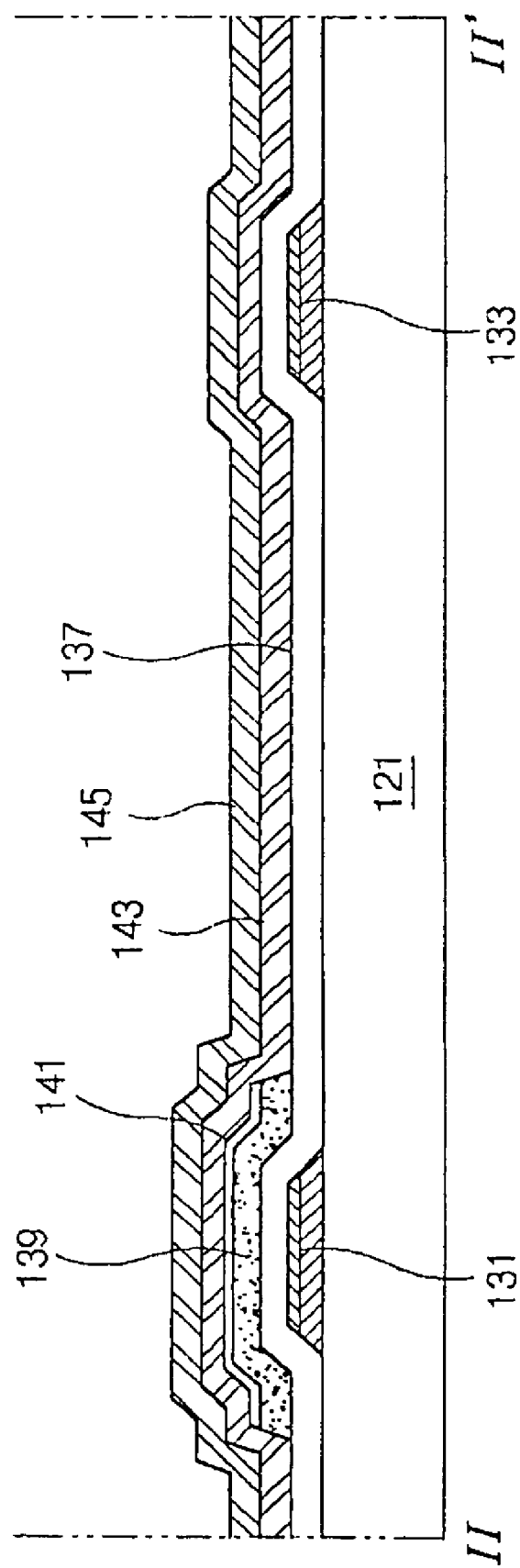
Figure 6G:
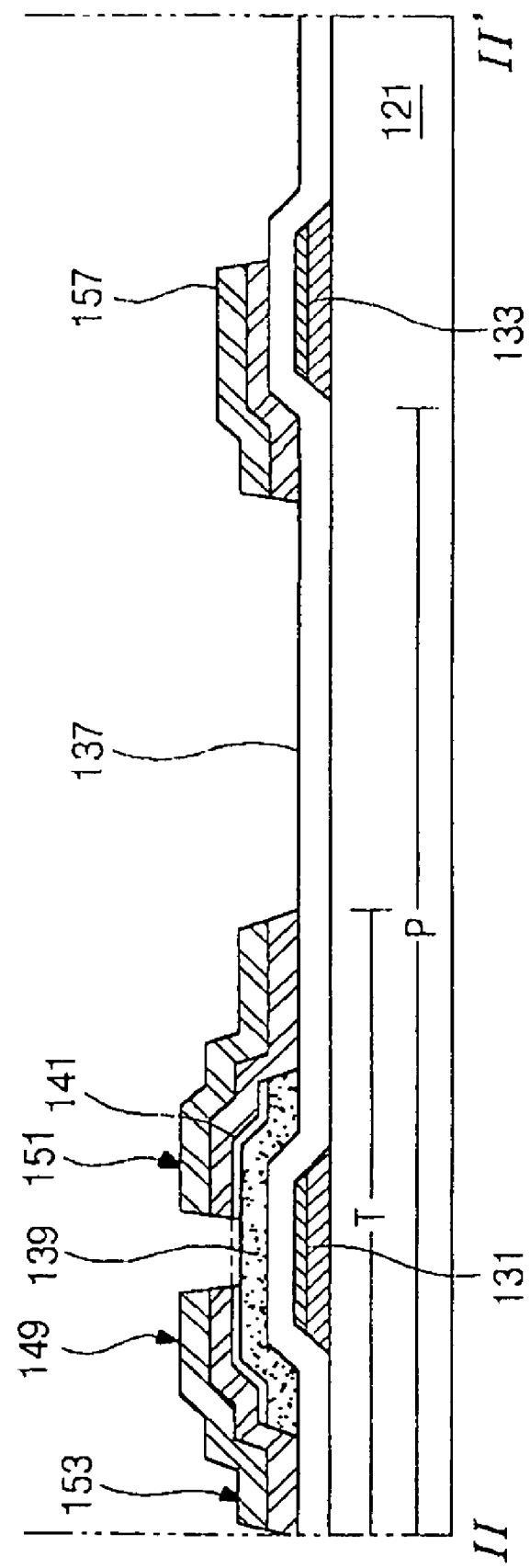
Figure 7F:
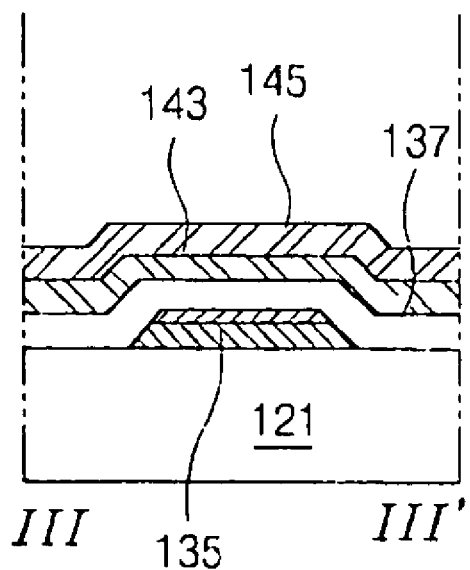
Figure 7G:
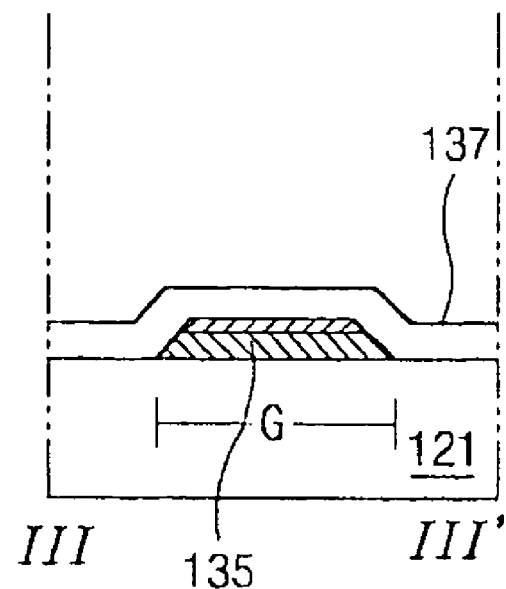
Figure 8F:
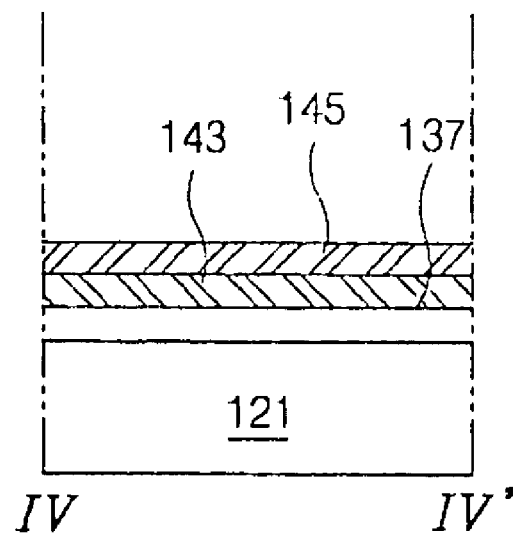

FIGS. 6F-6G, 7F-7G and 8F-8G show a third mask process. In FIGS. 6F, 7F and 8F, third and fourth metal layers 143 and 145 are sequentially formed on the gate insulation layer 137 to cover both the active layer 137 and the ohmic contact layer 141. Here, the third metal layer 143 can be one of tantalum (Ta), titanium (Ti), molybdenum (Mo), molybdenum alloy (Mo-alloy), chromium (Cr), tantalum nitride (TaN), titanium nitride (TiN), tungsten (W), nickel (Ni), indium (In), tin (Sn), gold (Au), and an alloy thereof. Further, the fourth metal layer 145 is copper (Cu). The third metal layer 143 acts as a barrier metal that is used to prevent the copper layer 145 from directly contacting the semiconductor layer of active layer 139 and of ohmic contact layer 141 because the copper layer 145 may react with silicon included in the active and ohmic contact layers 139 and 141. Therefore, the double-layered structure of the second barrier metal layer and the copper layer is disposed on the gate insulation layer 137.

Figure 8G:
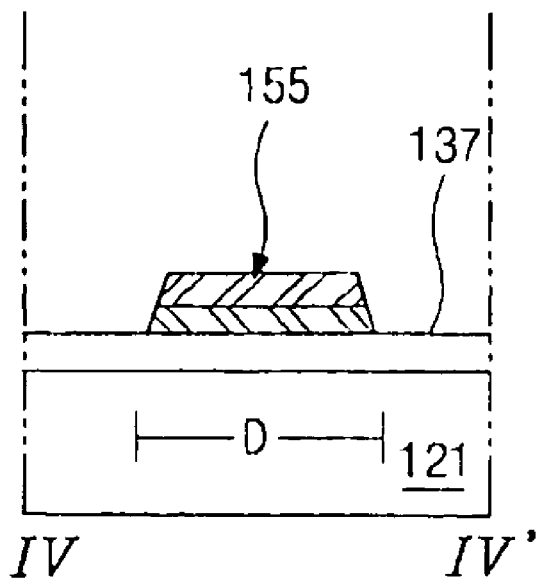

Thereafter, the third and fourth metal layers 143 and 145 are simultaneously patterned throughout a third mask process. Thus, as shown in FIGS. 6G, 7G and 8G, a source electrode 149, a drain electrode 151, a data line 153, a data pad 155 and a capacitor electrode 157, which have a double-layered structure, are formed over the substrate 121. The source electrode 149 extends from the data line 153 and contacts the ohmic contact layer 141. The drain electrode 151 is spaced apart from the source electrode 149 and also contacts the ohmic contact layer 141. As mentioned before, the data pad 155 is at the end of the data line 153, and the capacitor electrode 157 is shaped like an island and disposed above the double-layered gate line 133. As shown in FIGS. 6G, 7G and 8G, the source and drain electrodes 149 and 151 are disposed to correspond with the TFT region T, and the gate and data pads 135 and 155 are disposed to correspond with the gate and data regions G and D, respectively. After forming the source and drain electrodes 149 and 151, a portion of the ohmic contact layer 141 between the source and drain electrodes 149 and 151 is removed to form a channel region.

Figure 6H:
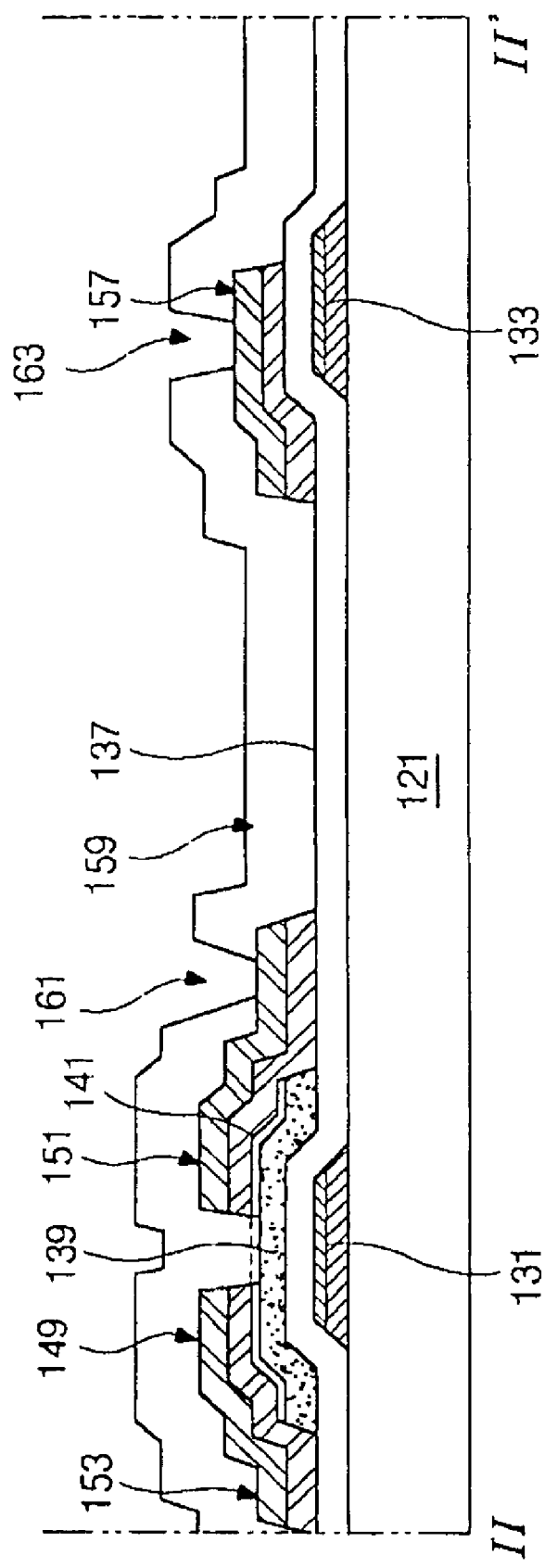
Figure 7H:
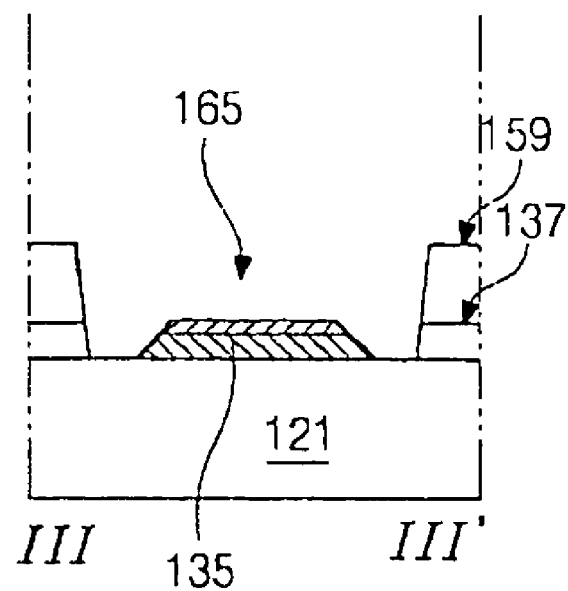
Figure 8H:
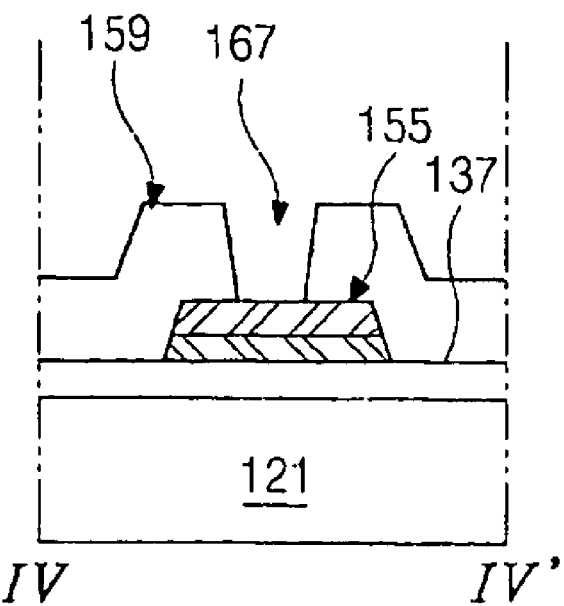

FIGS. 6H, 7H and 8H show a process step of a fourth mask process. As shown, a passivation layer 159, which is an insulation material, is formed all over the substrate 121. The passivation layer 159 covers the source and drain electrodes 149 and 151, the data line 153, the data pad 155 and the storage capacitor 157. By patterning the passivation layer 159 throughout the fourth mask process, a drain contact hole 161, a storage contact hole 163, a gate pad contact hole 165, and a data pad contact hole 167 are formed. The drain contact hole 161 exposes a portion of the drain electrode 151, the storage contact hole 163 exposes a portion of the capacitor electrode 157, the gate pad contact hole 165 exposes the gate pad 135, and the data pad contact hole 167 exposes the data pad 155. An inorganic material, such as silicon oxide ($SiO_2$) or silicon nitride ($SiN_x$), or an organic material, such as benzocyclobutene (BCB) or acrylic resin, or double layers thereof may be used as a material for the passivation layer 159.

Figure 6I:
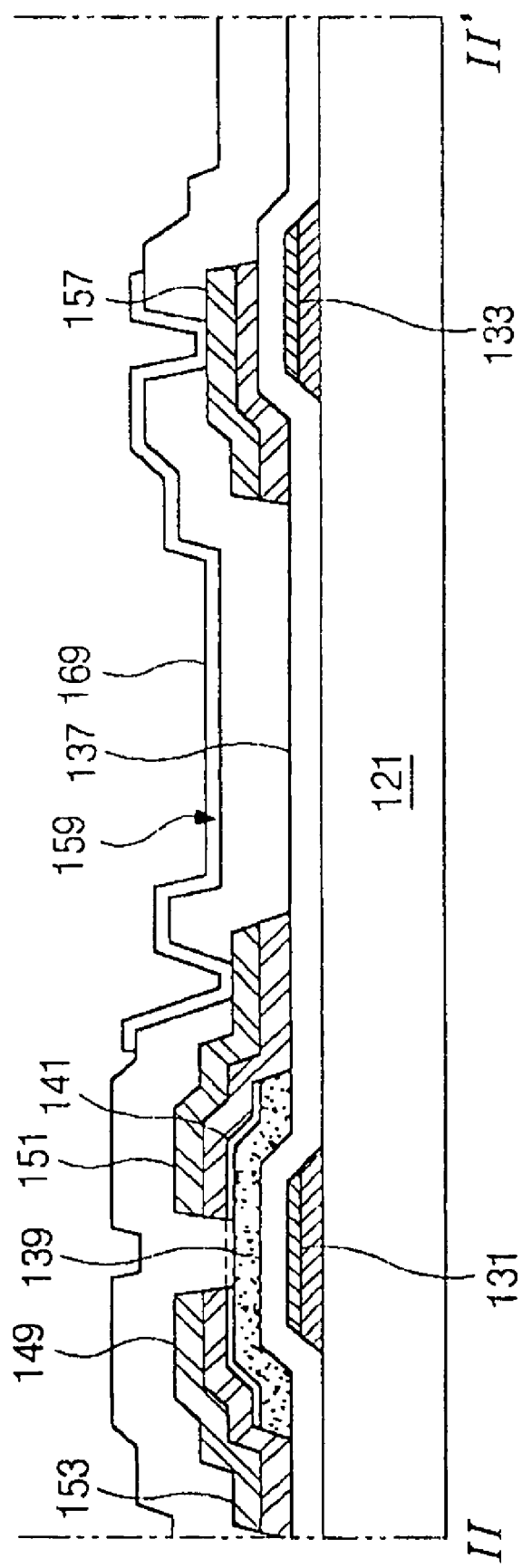
Figure 7I:
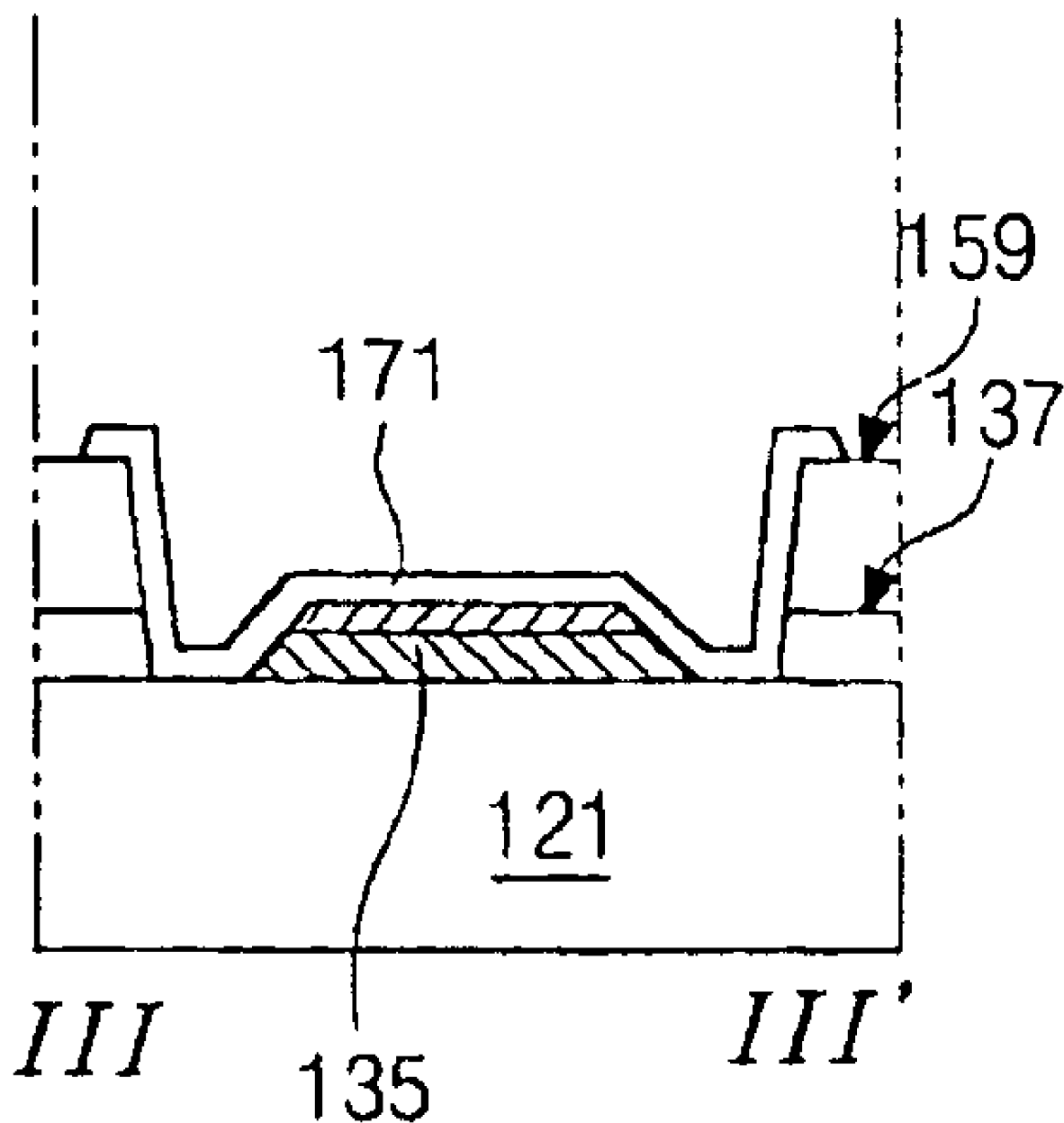
Figure 8I:
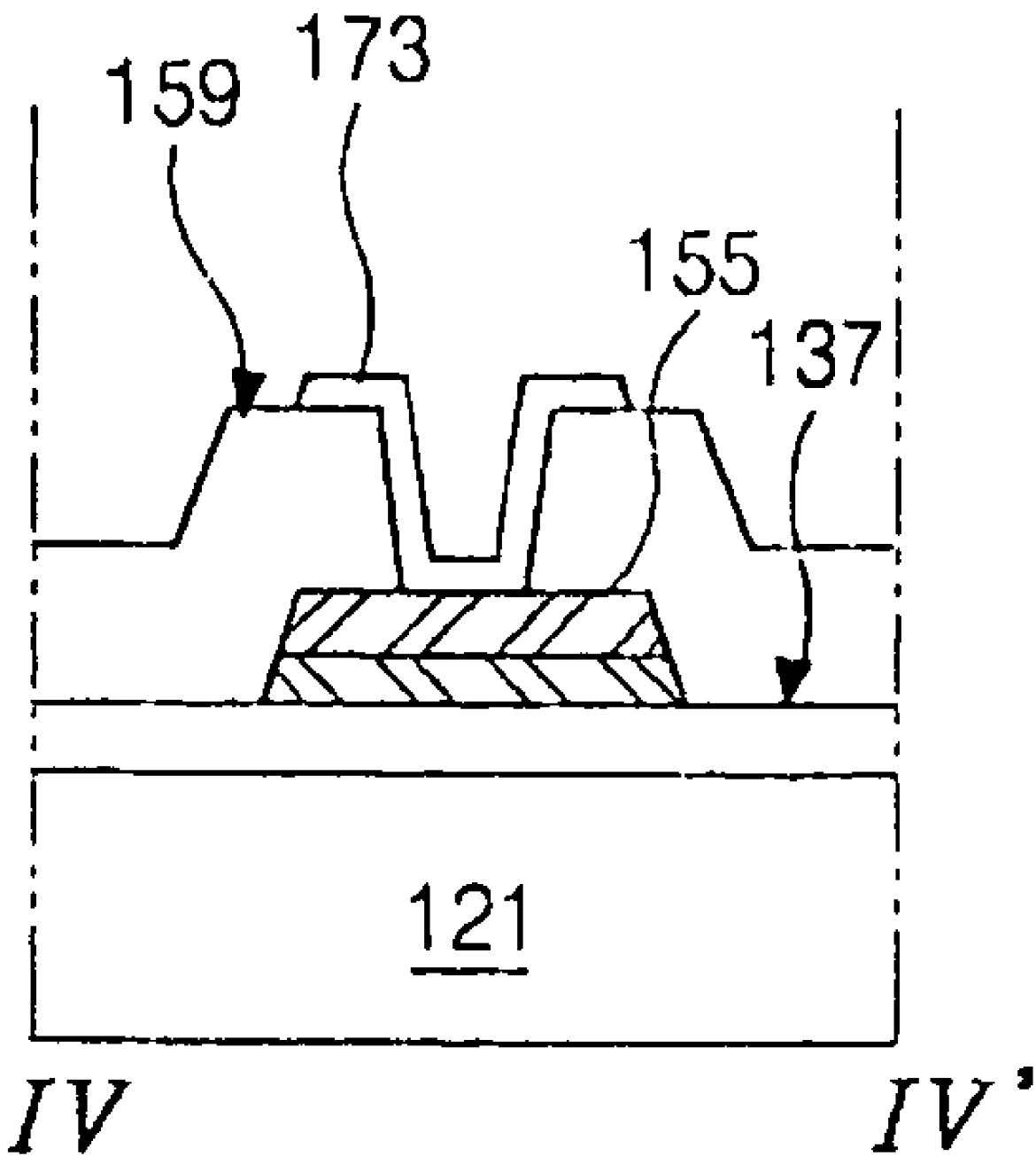

In FIGS. 6I, 7I and 8I, a transparent conductive material is deposited on the passivation layer 159 having the above-mentioned holes, and then patterned through a fifth mask process to form a pixel electrode 169, a gate pad terminal 171 and a data pad terminal 173. The transparent conductive material may be one of indium tin oxide (ITO) and indium zinc oxide (IZO). The pixel electrode 169 contacts the drain electrode 151 and the capacitor electrode 157, respectively, through the drain contact hole 161 and storage contact hole 163. Further, the gate pad terminal 171 contacts the gate pad 135 through the gate pad contact hole 165, and the data pad terminal 173 contacts the data pad 155 through the data pad contact hole 167. Accordingly, the array substrate in embodiments of the present invention is complete.

In the above-mentioned embodiments of the present invention, since aluminum (Al) or aluminum alloy, which has a low resistance, is used for the gate electrode and line and since the aluminum or aluminum alloy layer is protected by the overlying barrier metal layer, the array substrate has superior operating characteristics. Further, since copper (Cu), which also has a low electrical resistance, is used for the data line and the source and drain electrodes, the thin film transistor can become a good array element in the array substrate. Accordingly, signal delay can be prevented in the gate and data lines such that the array substrate can be large in size without suffering from the signal delay such as that described with respect to of the related art. In the above-mentioned process, the double layers of the barrier metal and the copper layer are utilized in the source and drain electrodes. The reaction between the copper layer and the semiconductor layer is prevented and the large leakage current is also reduced in the thin film transistor because a barrier metal of one of tantalum (Ta), titanium (Ti), molybdenum (Mo), molybdenum alloy (Mo-alloy), chromium (Cr), tantalum nitride (TaN), titanium nitride (TiN), tungsten (W), nickel (Ni), indium (In), tin (Sn), gold (Au), and an alloy thereof is used underneath the copper layer.

Figure 9:
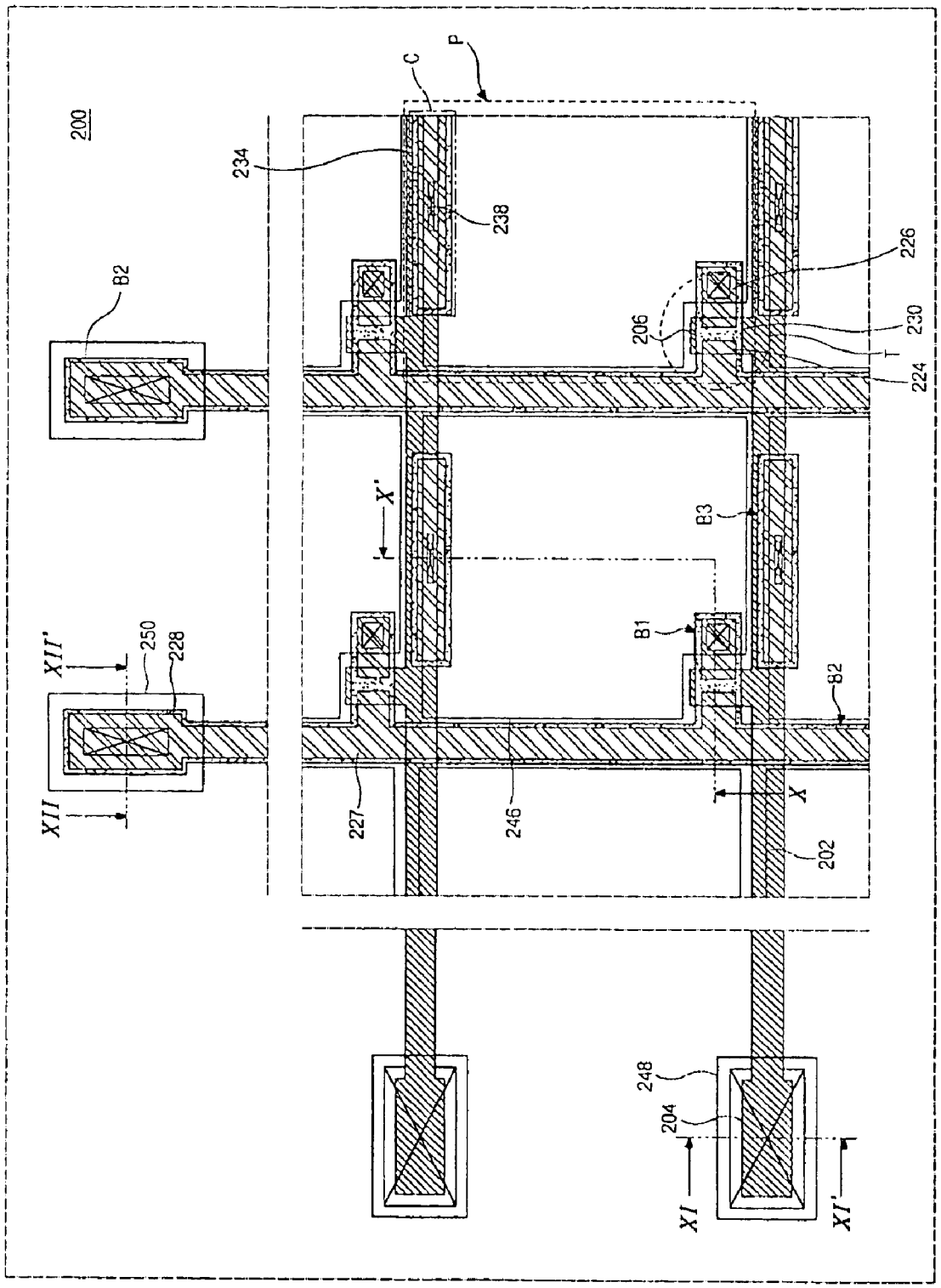
FIG. 9 is a partially enlarged plan view of an exemplary array substrate according to a second embodiment of the present invention.

FIG. 9 is a partially enlarged plan view of an exemplary array substrate according to a second embodiment of the present invention. In this second embodiment, the array substrate not only includes double-layered metal patterns but also is fabricated throughout a four-mask process. As shown in FIG. 9, a plurality of gate lines 202 is disposed in a transverse direction on a substrate 200 and spaced apart from each other by a predetermined distance. A plurality of data lines 227 is disposed in a longitudinal direction substantially perpendicular to the gate lines 202, and spaced apart from each other by a desired distance. Pairs of the gate and data lines 202 and 227 define pixel regions P. A gate pad 204 is disposed at one end of each gate line 202, and a data pad 228 is disposed at one end of each data line 227.

A thin film is provided adjacent to where gate and datalines 202 and 227 cross transistor T including a gate electrode 206, an active layer 230, a source electrode 224, and a drain electrode 226. The gate electrode 206 extends from the gate line 202, whereas the source electrode 224 extends from the data line 227. The active layer 230 is disposed over the gate electrode 206, and the source and drain electrodes 224 and 226 are disposed over the active layer 230. A pixel electrode 246 is located in the pixel region. The pixel electrode electrically contacts and communicates with the drain electrode 226 of the thin film transistor T. A gate pad terminal 244 and a data pad terminal 250 are disposed over the gate pad 204 and the data pad 228, and contact the gate and data pads 204 and 228, respectively. The pixel electrode 246 and the gate and data pad terminals 248 and 250 are all formed of a transparent conductive material.

In this second embodiment shown in FIG. 9, all of the gate electrode 206, the gate line 202, the gate pad 204, the source electrode 224, the drain electrode 226, the data line 227, and the data pad 228 have a double layered structure. The gate electrode 206, the gate line 202, and the gate pad 204 have a first metal layer of aluminum or aluminum alloy and a second metal layer of one of tantalum (Ta), titanium (Ti), molybdenum (Mo), molybdenum alloy (Mo-alloy), chromium (Cr), tantalum nitride (TaN), titanium nitride (TiN), tungsten (W), nickel (Ni), indium (In), tin (Sn), gold (Au), or an alloy thereof. The source and drain electrodes 224 and 226, the data line 227, and the data pad 228 have a third metal layer of one of tantalum (Ta), titanium (Ti), molybdenum (Mo), molybdenum alloy (Mo-alloy), chromium (Cr), tantalum nitride (TaN), titanium nitride (TiN), tungsten (W), nickel (Ni), indium (In), tin (Sn), gold (Au), or an alloy thereof, and a fourth metal layer of copper, similar to the first embodiment. The second and third metal layer can be referred to as first, and second barrier layers.

The array substrate shown in FIG. 9 is fabricated through a four-mask process as compared to the first embodiment. Therefore, the double-layered metal patterns, such as the source and drain electrodes 224 and 226, the data line 227 and the data pad 228, are formed with the active layer 230.

Namely, a first semiconductor pattern B1 is disposed underneath the source and drain electrodes 224 and 226, and a second semiconductor pattern B2 is disposed underneath the data line and pad 227 and 228. The semiconductor patterns can be different in shape. Furthermore, a capacitor electrode 234 that also has a double layered metal structure like the source and drain electrodes 224 and 226 is disposed over the gate line 202. Since the capacitor electrode 234 is formed in the same process with the source and drain electrodes 224 and 226, a third semiconductor pattern B3 is disposed underneath the capacitor electrode 234. The capacitor electrode 234 and the overlapped portion of the gate line 202 constitute a storage capacitor C with an interposed insulator (not shown).

FIGS. 10A-10H, 11A-11H and 12A-12H are cross sectional views taken along lines X-X, XII-XII and XIII-XIII of FIG. 9, respectively, and illustrate the process steps of forming the array substrate according to the second embodiment of the present invention. FIGS. 10A-10H show the process steps of forming the thin film transistor, the pixel and the storage capacitor, FIGS. 11A-11H show the process steps of forming the gate pad, and FIGS. 12A-12H show the process steps of forming the data pad.

Figure 10A:
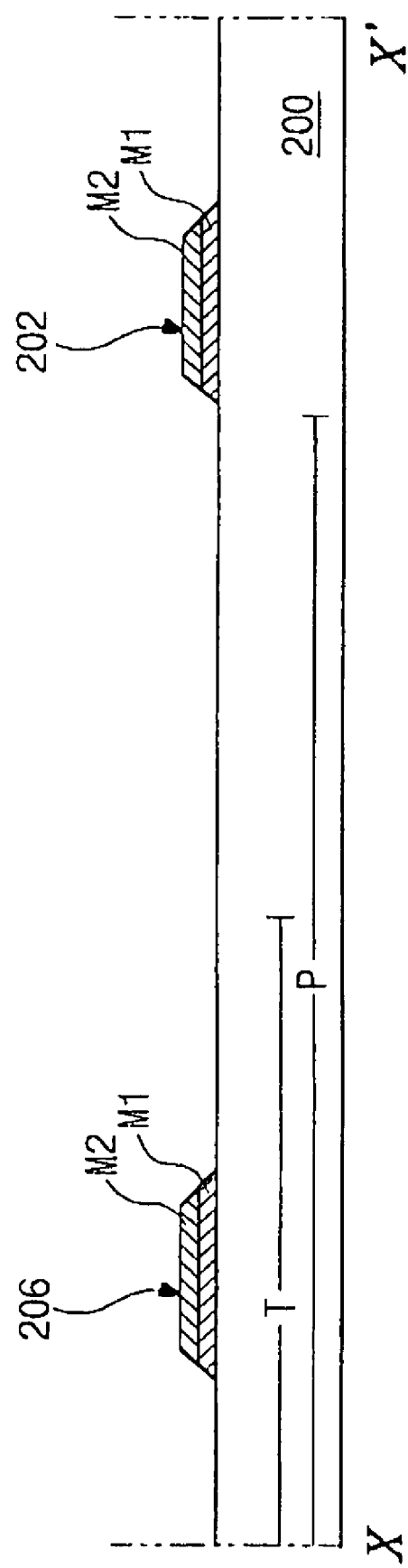
FIGS. 10A to 10H are cross sectional views taken along line X-X' of FIG. 9, illustrating a process for forming a pixel according to a second embodiment of the present invention.
Figure 11A:
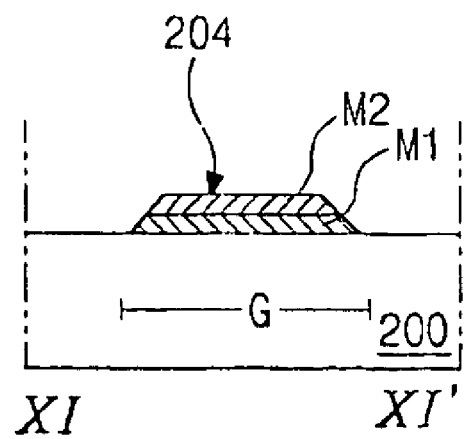
FIGS. 11A to 11H are cross sectional views taken along line XI-XI' of FIG. 9, illustrating a process for forming a gate pad according to the second embodiment of the present invention.
Figure 12A:
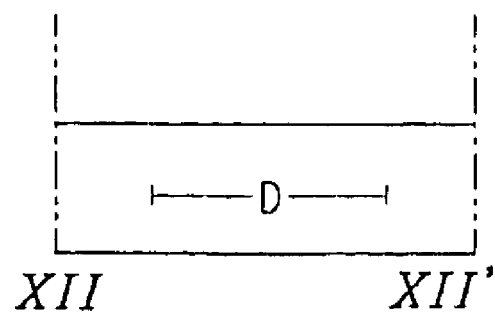
FIGS. 12A to 12H are cross sectional views taken along line XII-XII' of FIG. 9, illustrating a process for forming a data pad according to the second embodiment of the present invention.

In FIGS. 10A, 11A and 12A, a pixel region P, a switching region T, a pad region G and a data pad region D are defined in a substrate 200. The pixel region P is an area where the pixel electrode is located and is determined by the later-formed gate and data lines, and the switching region T is an area where the thin film transistor is defined and that is disposed at one corner of the pixel region P. The data pad region D is an area where the data pad is formed, and the gate pad region G is an area where the gate pad is formed. After defining such regions in the substrate 200, a first metal layer M1 and a second metal layer M2 are sequentially formed on the substrate 200, and simultaneously patterned to form double-layered gate line 202, pad 204 and electrode 206. The process of patterning the first and second metal layers M1 and M2 are the same as the process described with reference to FIGS. 6A-6D, 7A-7D and 8A-8D. Like in the first embodiment, the first metal layer M1 is aluminum (Al) or aluminum alloy (Al-alloy), and the second metal layer M2 is one of tantalum (Ta), titanium (Ti), molybdenum (Mo), molybdenum alloy (Mo-alloy), chromium (Cr), tantalum nitride (TaN), titanium nitride (TiN), tungsten (W), nickel (Ni), indium (In), tin (Sn), gold (Au), and an alloy thereof. The second metal layer M2 may have a thickness of 100-1000 angstroms (.ANG.), and acts as a first barrier layer that protects the underlying aluminum or aluminum alloy layer M1. As described hereinbefore, the gate electrode 206 extends from the gate line 202, and the gate pad 204 is at the end of the gate line 202. Each of the gate line 202, pad 204 and electrode 206 has the first metal layer M1 and the second metal layer M2, as shown in FIGS. 10A and 11A.

Figure 10B:
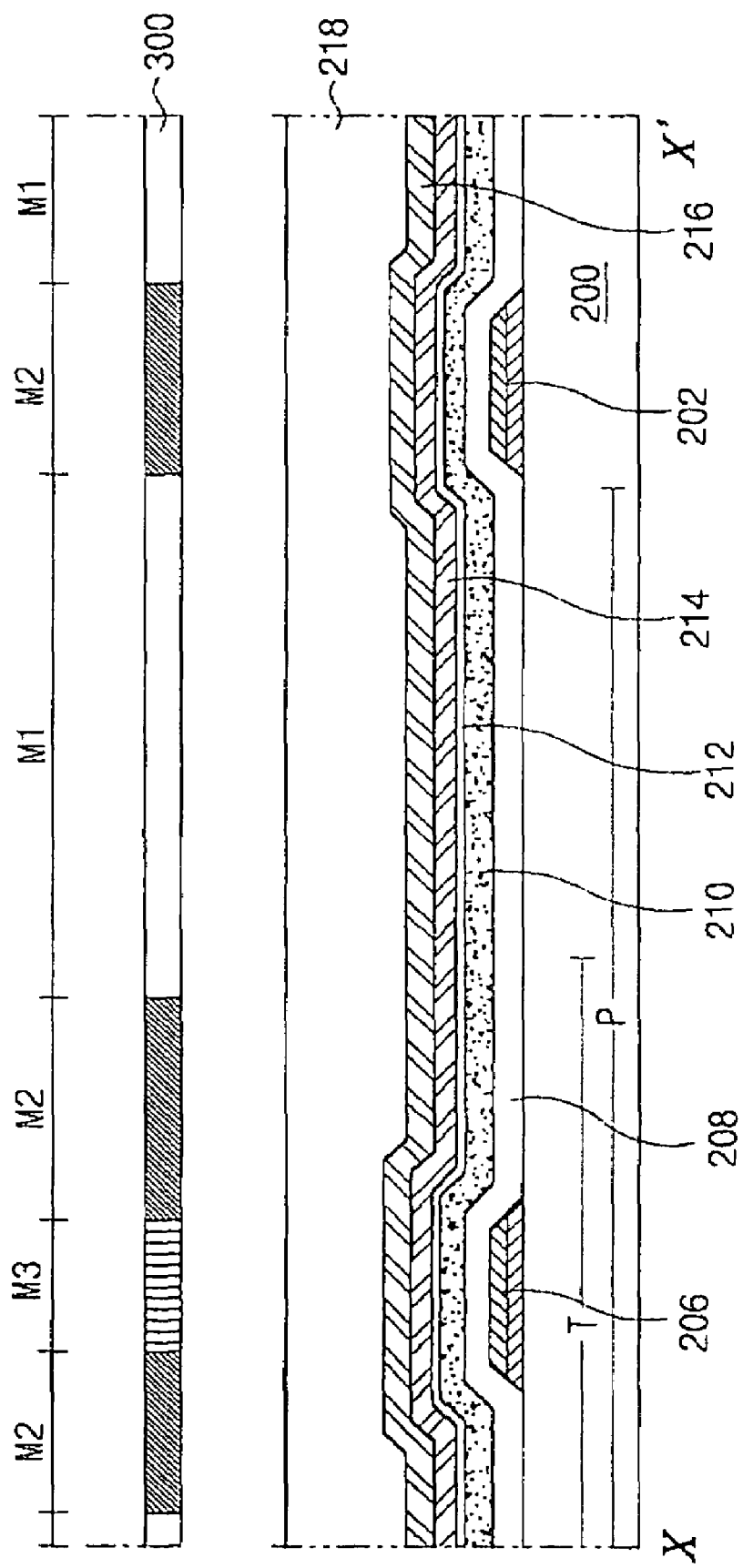
Figure 11B:
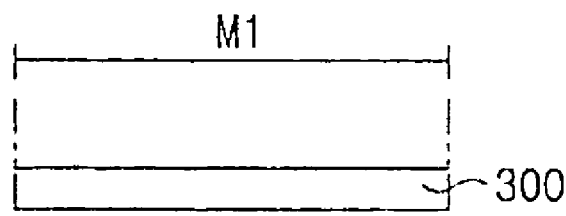
Figure 11B:
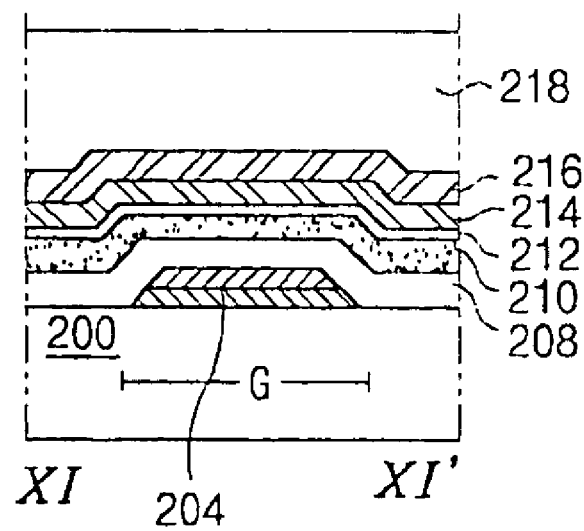
Figure 12B:
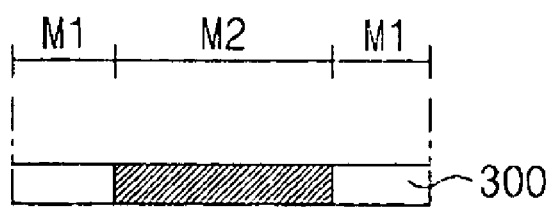
Figure 12B:
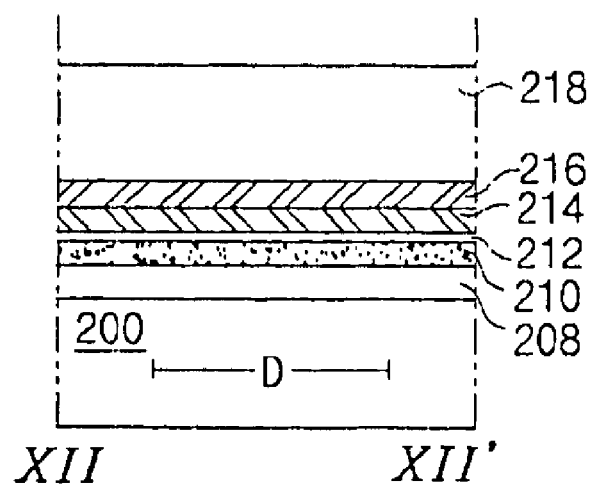

After patterning the first and second metal layers M1 and M2, a gate insulation layer 208 is formed over the substrate 200 to cover all first double-layered metal patterns, such as the gate electrode 206, the gate line 202 and the gate pad 204, as shown in FIGS. 10B, 11B and 12B. The gate insulation layer 208 may be an inorganic material, for example, silicon nitride ($SiN_x$) or silicon oxide ($SiO_2$). Thereafter, a pure amorphous silicon (a-Si:H) layer 210, a doped amorphous silicon ($n^+a$-Si:H) 212, a third metal layer 214, and a fourth metal layer 216 are sequentially deposited on the gate insulation layer 208. And then, a photoresist layer 218 is formed on the fourth metal layer 216. The third metal layer 214 may be one of tantalum (Ta), titanium (Ti), molybdenum (Mo), molybdenum alloy (Mo-alloy), chromium (Cr), tantalum nitride (TaN), titanium nitride (TiN), tungsten (W), nickel (Ni), indium (In), tin (Sn), gold (Au), and an alloy thereof, and the fourth metal layer 216 may be copper (Cu). The third metal layer 216 of copper has a thickness ranging from a 1000 to 5000 angstroms (A). The third metal layer 214 acts as a barrier metal that prevents the copper layer 216 from directly contacting the doped amorphous silicon layer 212 because the copper layer 216 may react with silicon included in the doped amorphous silicon layer 212.

After forming the photoresist layer 218, a second mask process is conducted. A mask 300 having first to third portions M1-M3 is disposed over the photoresist 218, and then light irradiates through the mask 300 to partially expose the photoresist layer 218. The first portions M1 are light-transmitting areas where the light thoroughly passes. The second portions M2 are light-shielding areas that completely block the light. The third portions M3 is a half transmitting area that permits half portions of the light to pass. The third portions M3 may include a plurality of slits or a semitransparent film. The second portions M2 correspond to the areas where the second double-layered metal patterns are formed. The third portion M3 corresponds to the area where a channel is formed over the gate electrode 206.

Figure 10C:
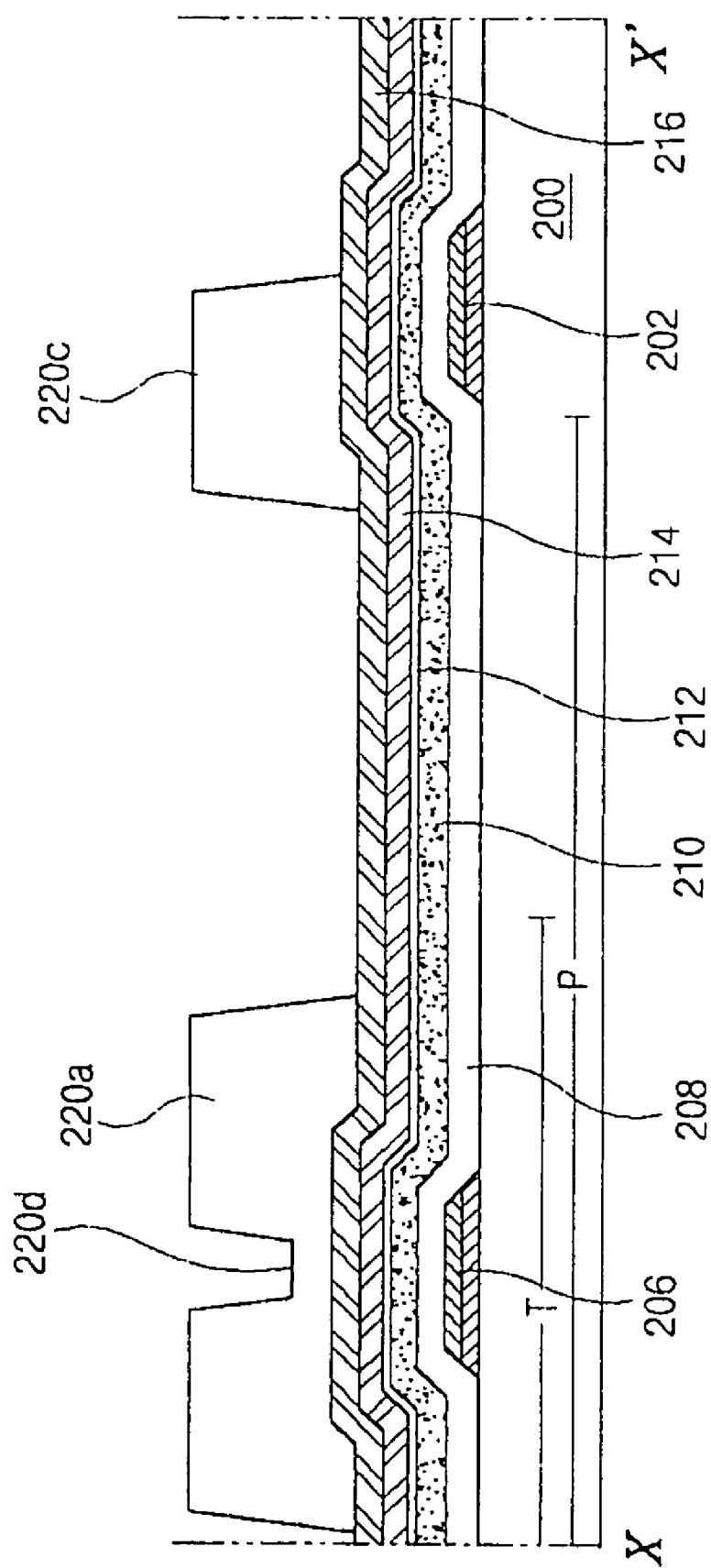
Figure 11C:
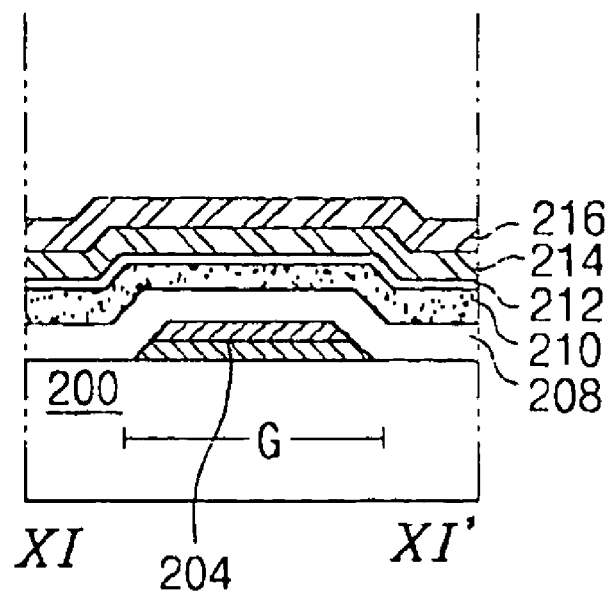
Figure 12C:
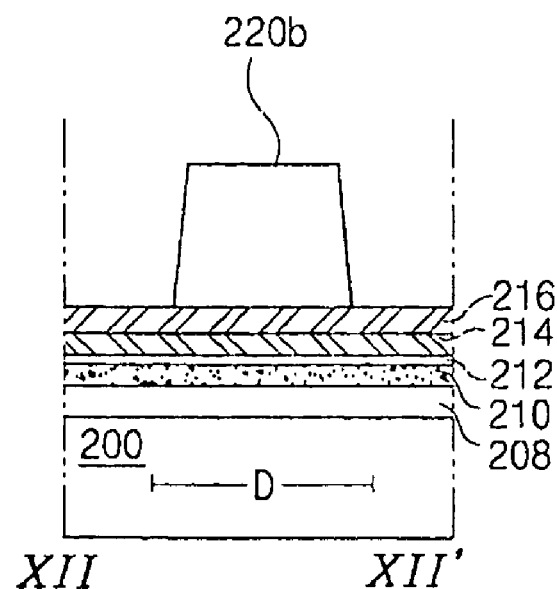

In FIGS. 10C, 11C and 12C, after the light exposure process using the mask 300, the photoresist layer 218 is developed, thereby forming first to fourth photoresist patterns 220a-220d. The first photoresist pattern 220a corresponds in position to the switching region T, the second photoresist pattern 220b to the data region D, and the third photoresist pattern 220c to the storage capacitor region over the gate line 202. Furthermore, the fourth photoresist pattern 220d is an indented portion that corresponds to the third portion M3 of the mask, and has smaller height than the first photoresist pattern 220a. Since only a half portion of light radiates through the third portion M3 of the mask 300 during the light exposure process, the indented fourth photoresist pattern 220d has a height of only half of the other first to third photoresist patterns 220a-220c. The fourth photoresist pattern 220d corresponds in position to the gate electrode 206.

Figure 10D:
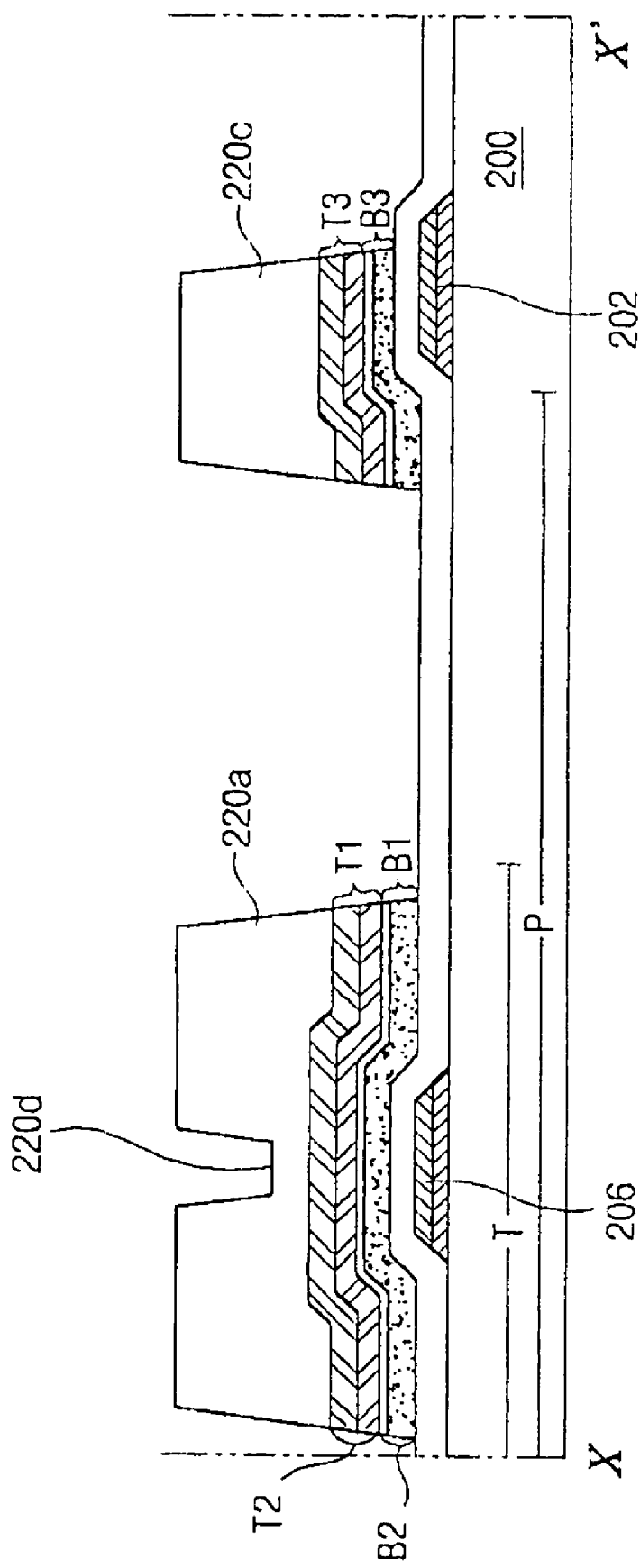
Figure 11D:
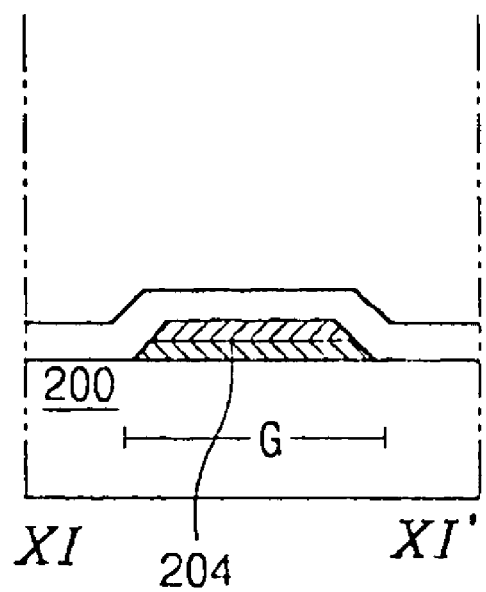
Figure 12D:
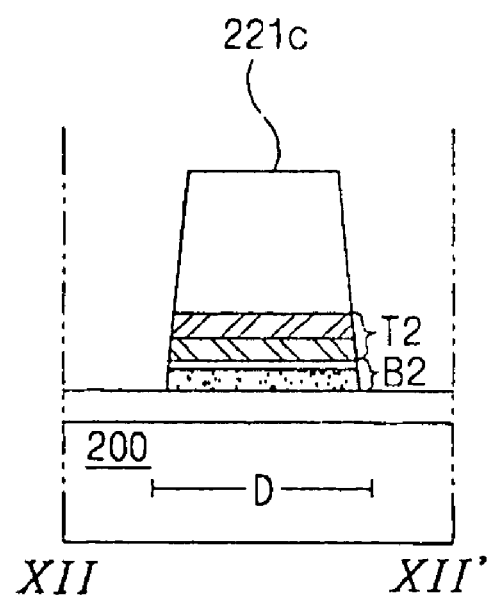

Next in FIGS. 10D, 11D and 12D, the pure amorphous silicon layer 210, the doped amorphous silicon layer 212, the third metal layer 214 and the fourth metal layer 216 are simultaneously patterned. Namely, the portions of the third and fourth metal layers 214 and 216, which are exposed by the first to fourth photoresist patterns 220a-220d, are simultaneously removed using an etching solution, i.e., the wet etching, and the pure and doped amorphous silicon layer 210 and 212 are etched using a dry etch method. Therefore, first to third metal patterns T1-T3 each comprised of barrier metal and copper layers are formed underneath the first to third photoresist patterns 220a-220c, respectively. Further, first to third silicon patterns B1, B2 and B3 each comprising a first layer of pure amorphous silicon and a second layer of doped amorphous silicon are formed underneath the first to third metal patterns T1, T2 and T3, respectively.

Figure 10E:
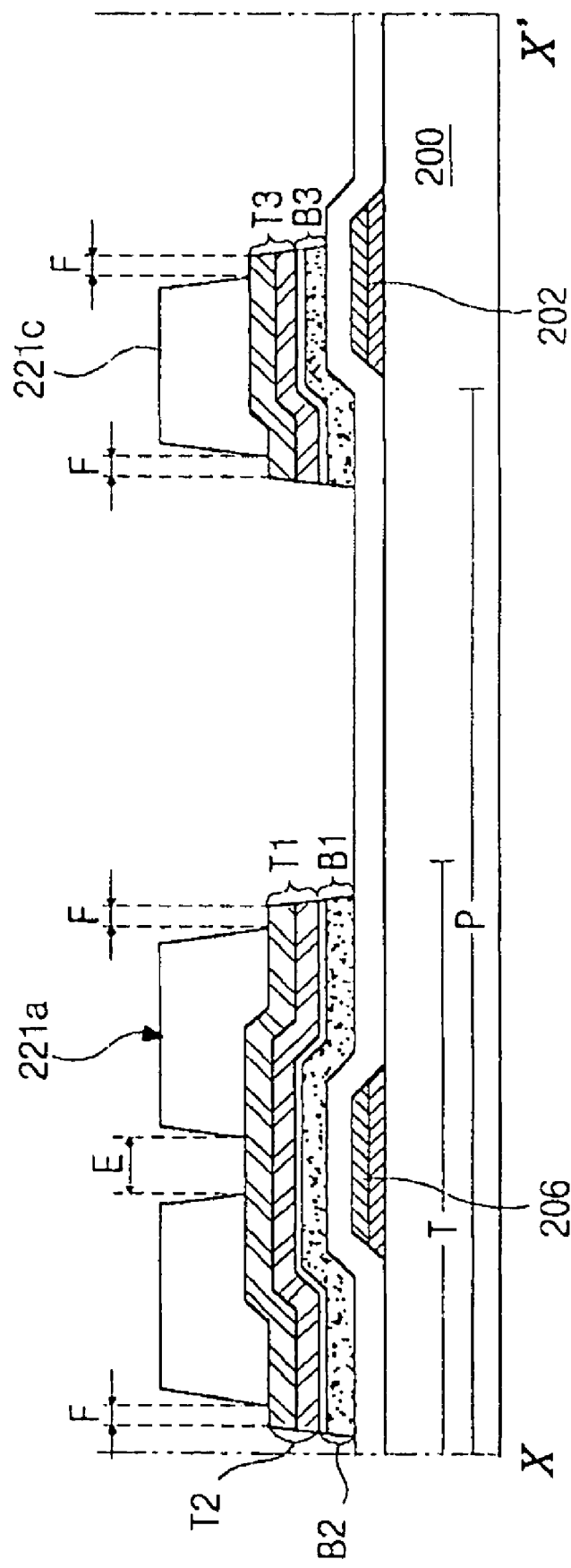
Figure 11E:
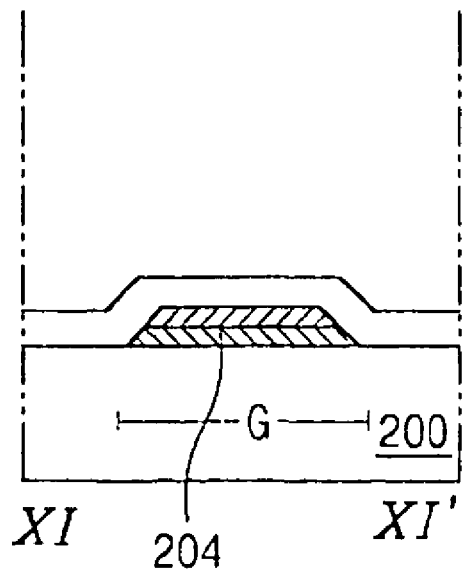
Figure 12E:
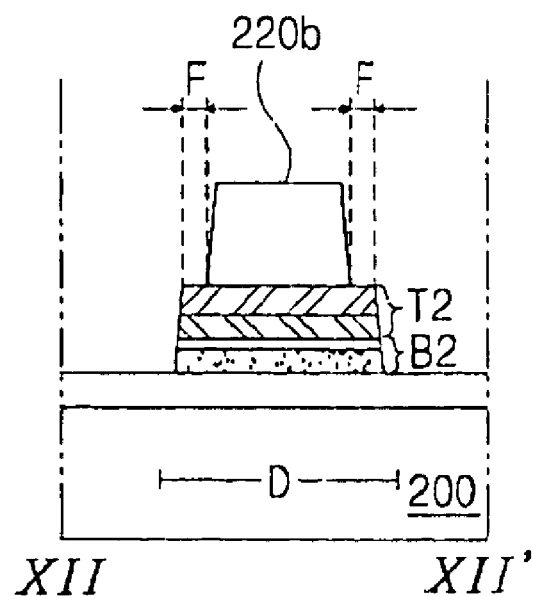

FIGS. 10E, 11E and 12E show a step of ashing the first to fourth photoresist patterns 220a-220d. Such ashing process is conducted till the indented fourth photoresist pattern 220d is completely removed to expose an underlying portion H of the first metal pattern T1 corresponding to the gate electrode 306, thereby forming first to third ashed photoresist patterns 221a-221c. After the ashing process, peripheral portions F of the first to third metal patterns T1-T3 are exposed because those peripheral portions of photoresist patterns are also removed during the ashing process.

Figure 10F:
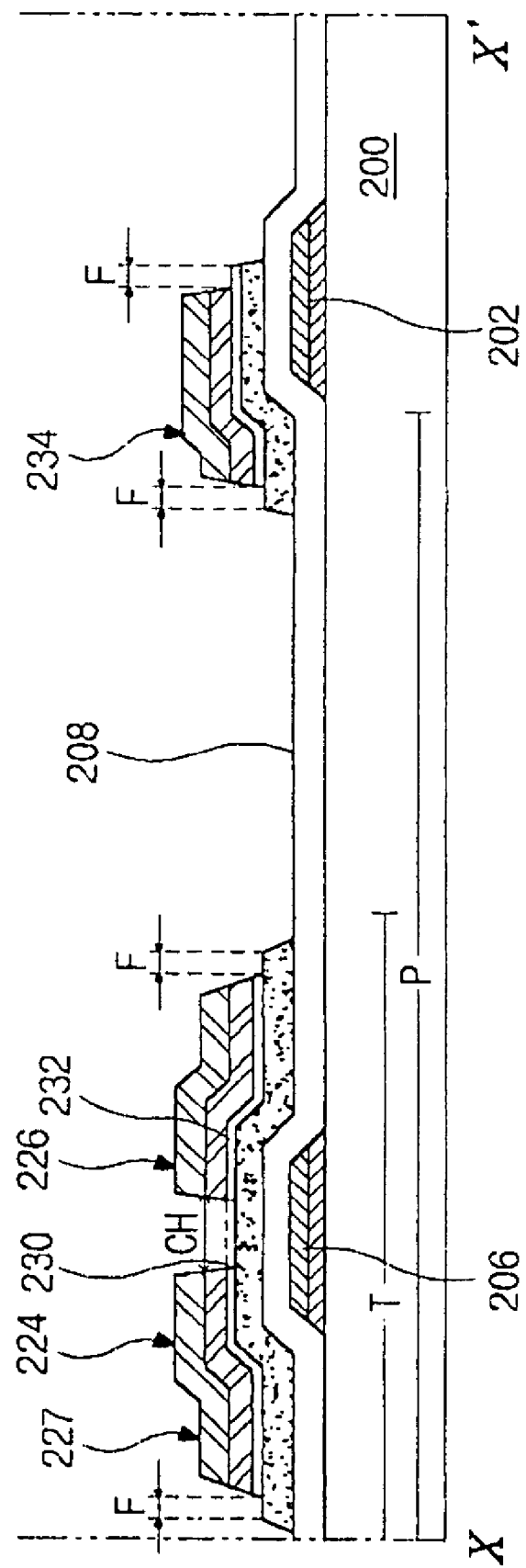
Figure 11F:
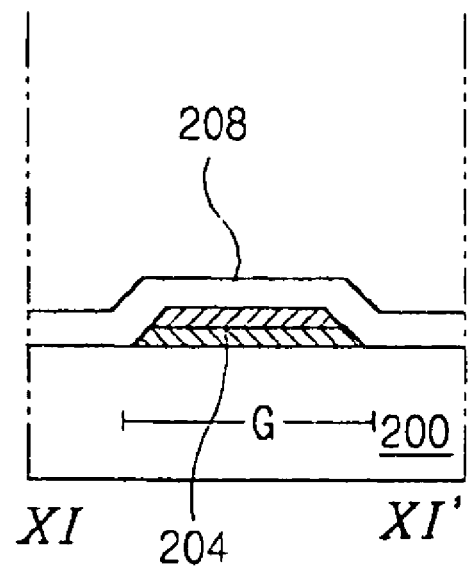
Figure 12F:
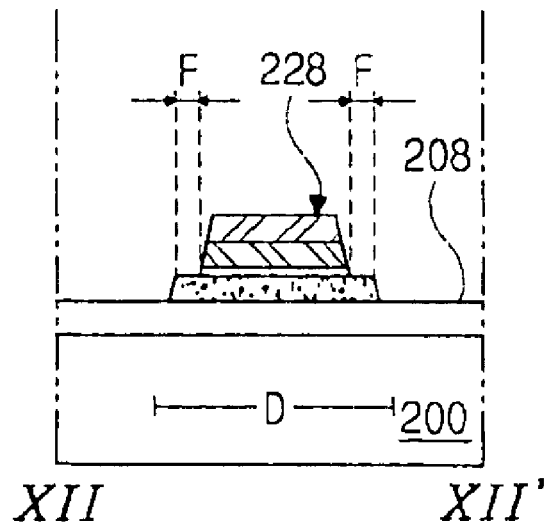

Now in FIGS. 10F, 11F and 12F, the exposed peripheral portions F of the first to third metal patterns T1-T3 are removed, thereby forming a source electrode 224, a drain electrode 226, a data line 227, a data pad 228, and a capacitor electrode 234. Further, the exposed portion H of the first metal pattern T1 is also removed. After that, portions of the doped amorphous silicon layers, which are exposed by the removal of the exposed portions and H of the metal patterns T1-T3, are also eliminated so that the underlying pure amorphous silicon layers are exposed in peripheries. Further, the pure amorphous silicon layer of the first silicon pattern B1 becomes an active layer 230, and becomes to have a channel CH between the source and drain electrodes 224 and 226. The doped amorphous silicon layer on the active layer 230 becomes an ohmic contact layer 232. Thereafter, all of the first to third ashed photoresist patterns 221a-221c are completely eliminated from the underlying metal patterns. Accordingly, the second mask process is complete as described with reference to FIGS. 10B-10F, 11B-11F and 12B-12F.

Figure 10G:
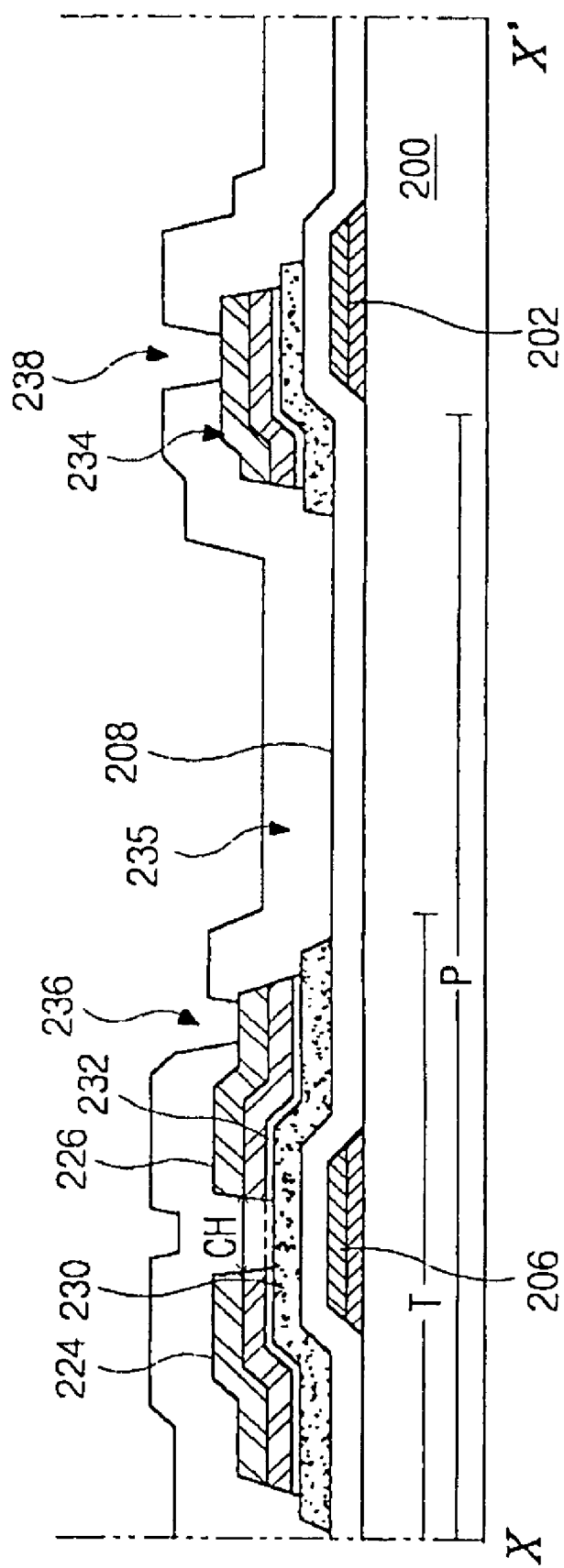
Figure 11G:
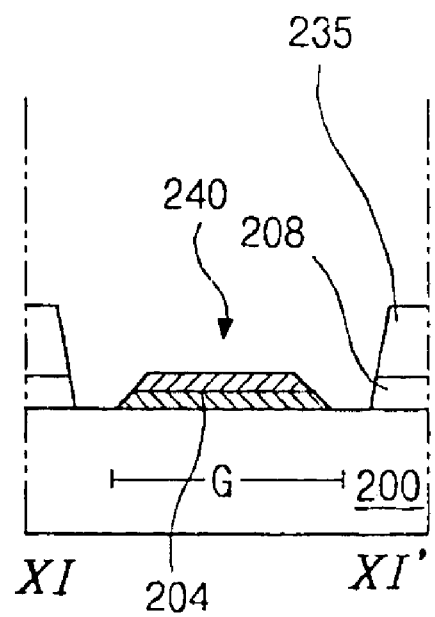
Figure 12G:
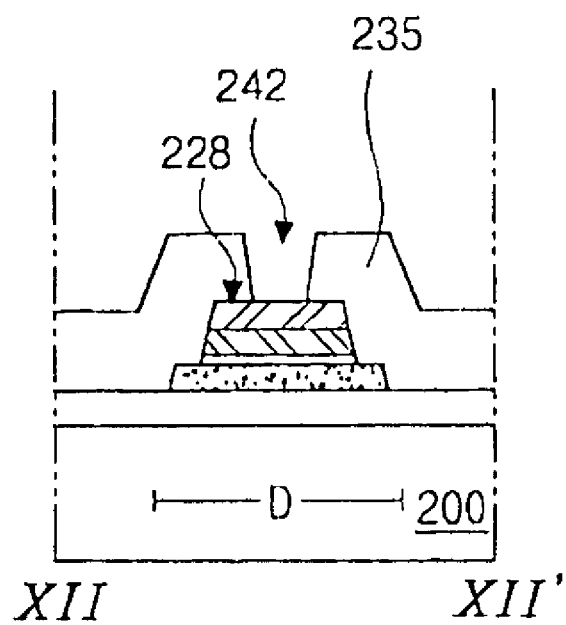

In FIGS. 10G, 11G and 12G, a passivation layer 235 is formed over an entire substrate 200 to cover the source electrode 224, the drain electrode 226, the data line 227, the data pad 228, and the capacitor electrode 234. The passivation layer 235 may be an organic material, for example, benzocyclobutene (BCB) or acrylic resin. Thereafter, the process step of a third mask is conducted. Namely, the passivation layer 235 is patterned throughout the third mask process, thereby forming a drain contact hole 236, a storage contact hole 238, a gate pad contact hole 240 and a data pad contact hole 242. The gate pad contact hole 240 and the data pad contact hole 242 expose a portion of the gate pad 204 and a portion of the data pad 228, respectively. The drain contact hole 236 exposes a portion of the drain electrode 226, and the storage contact hole 238 exposes a portion of the capacitor electrode 234.

Figure 10H:
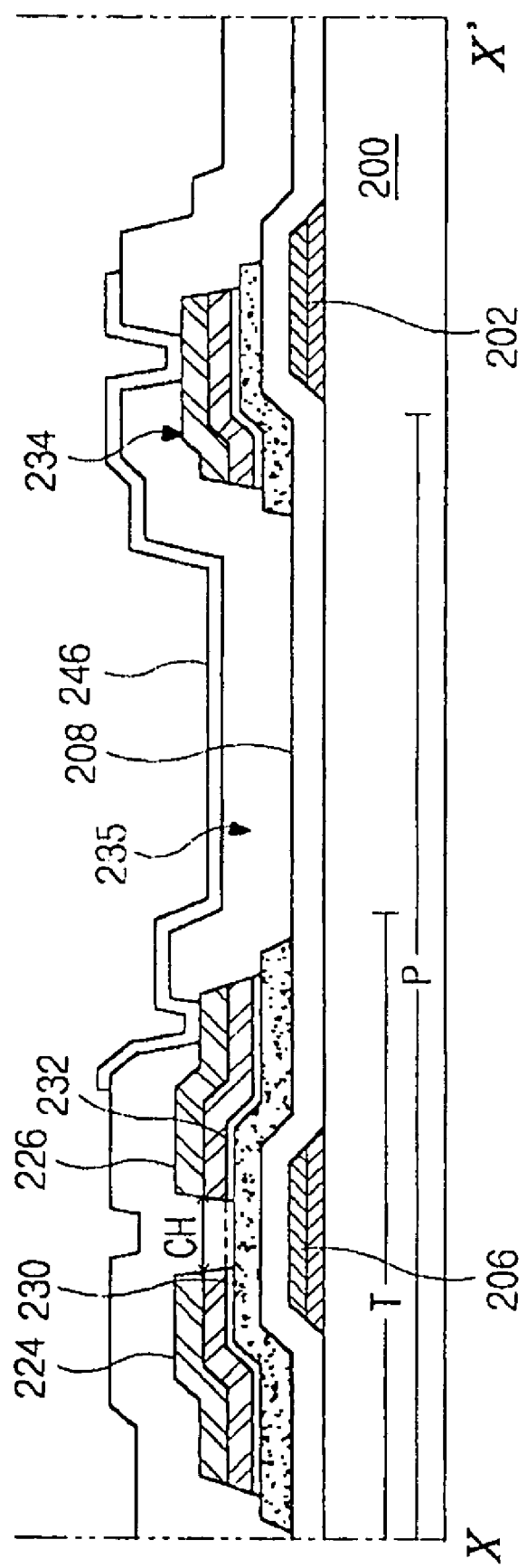
Figure 11H:
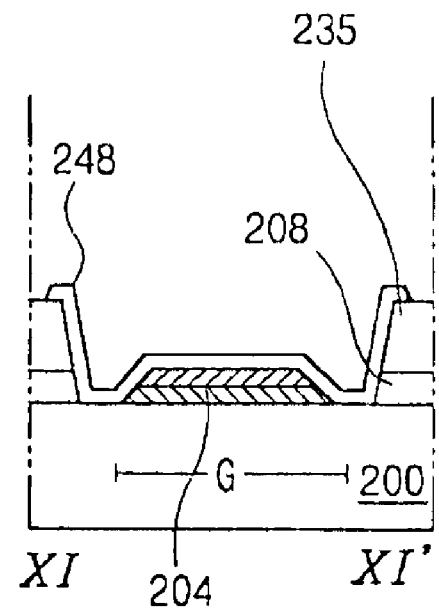
Figure 12H:
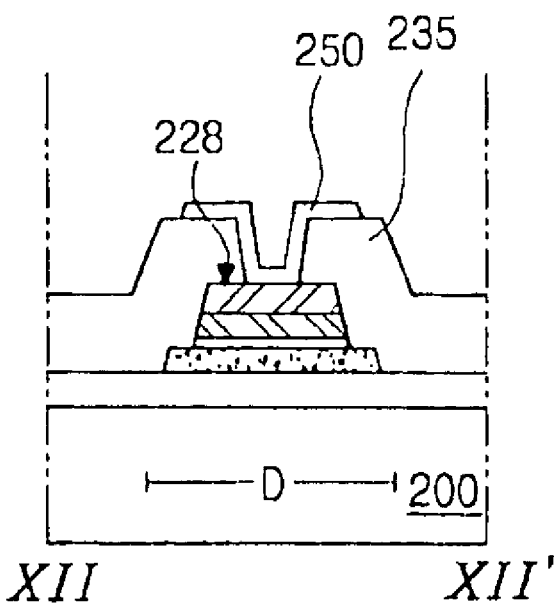

In FIGS. 10H, 11H and 12H, a transparent conductive material is deposited on the passivation layer 235 having the above-mentioned holes, and then patterned throughout a fourth mask process to form a pixel electrode 246, a gate pad terminal 248 and a data pad terminal 250. The transparent conductive material may be one of indium tin oxide (ITO) and indium zinc oxide (IZO). The pixel electrode 246 is disposed in the pixel region P, and contacts the drain electrode 226 and the capacitor electrode 234, respectively, through the drain contact hole 236 and storage contact hole 238. Further, the gate pad terminal 248 contacts the gate pad 204 through the gate pad contact hole 240, and the data pad terminal 250 contacts the data pad 228 through the data pad contact hole 242. Accordingly, the array substrate of the second embodiment of present invention is complete through a four-mask process.

In the above-mentioned embodiment of present invention, since aluminum (Al) and copper (Cu), which have low resistance, is used for the electrodes and lines, the array substrate has superior operating characteristics. For example, the thin film transistor can become a good array element in the array substrate. Further, since the gate and data lines include aluminum and copper, respectively, the signal delays are reduced or prevented in those lines. Therefore, if such structures including aluminum and copper are used in large liquid crystal panel, the LCD device can represent a superior image quality. Further, since the array substrate can be fabricated through a four-mask process, the fabrication process time can be reduced and the manufacturing yield increased.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of forming an array substrate for use in a liquid crystal display device, comprising:
    forming a first metal layer and a first barrier metal layer in series on a substrate, wherein the first metal layer is one of aluminum and aluminum alloy;
    patterning simultaneously both the first metal layer and the first barrier metal layer using a first mask process to form a gate electrode, a gate line and a gate pad on the substrate, wherein the gate electrode, the gate line and the gate pad have a double-layered structure including of the first metal layer and the first barrier metal layer;
    forming a gate insulation layer on the substrate to cover the double-layered gate electrode, line and pad;
    forming sequentially a pure amorphous silicon layer, a doped amorphous silicon layer, a second barrier layer and a second metal layer of copper on the gate insulation layer;
    patterning simultaneously the pure and doped amorphous silicon layers and the second barrier and second metal layers using a second mask process to form a data line, source and drain electrodes, a data pad, and silicon patterns, wherein the data line is on the gate insulation layer and crossed the gate line, wherein the data line, the source and drain electrodes, the capacitor electrode and the data pad have a double-layered structure including the second barrier metal layer and the second metal layer of copper, and wherein the silicon patterns consist of a first layer of pure amorphous silicon and a second layer of doped amorphous silicon and are disposed underneath the data line, the data pad, and the source and drain electrodes;
    forming a passivation layer formed on the gate insulation layer to cover the double-layered data line, source and drain electrodes, and data pad;
    patterning the passivation layer using a third mask process to form a drain contact hole exposing the drain electrode, a gate pad contact hole exposing the gate pad, and a data pad contact hole exposing the data pad; and
    forming a pixel electrode, a gate pad terminal and a data pad terminal on the passivation layer using a fourth mask process,
    wherein a width of the gate pad contact hole is greater than a width of the gate pad, and wherein the gate pad terminal contacts an upper surface of the first barrier metal layer of the gate pad and side surfaces of the first barrier metal layer and the first metal layer of the gate pad through the gate pad contact hole.

2. The method according to claim 1, wherein each of the first and second barrier metal layer is formed of a metallic material selected from a group consisting of tantalum (Ta), titanium (Ti), molybdenum (Mo), molybdenum alloy (Mo-alloy), chromium (Cr), tantalum nitride (TaN), titanium nitride (TiN), tungsten (W), nickel (Ni), indium (In), tin (Sn), gold (Au), and an alloy thereof.

3. The method according to claim 1, wherein each of the first and second barrier metal layers has a thickness of 100 to 1000 angstroms.

4. The method according to claim 1, wherein the second metal layer of copper has a thickness of 1000 to 2000 angstroms.

5. The method according to claim 1, wherein the gate electrode extends from the gate line, and the gate pad is at an end of the gate line.

6. The method according to claim 1, wherein the source and drain electrodes, the data pad, and the data line contact the doped amorphous silicon layer of the silicon patterns.

7. The method according to claim 1, wherein the source electrode extends from the data line, the drain electrode is spaced apart from the source electrode, and the data pad is at an end of the data line.

8. The method according to claim 1, wherein the pixel electrode is disposed in a pixel region defined by crossing of the gate and data lines, and wherein said pixel electrode contacts the drain electrode through the drain contact hole, and the data pad terminal contacts the data pad through the data pad contact hole.

9. The method according to claim 1, wherein forming the data line, the source and drain electrodes and the data pad includes forming a double-layered silicon pattern on the gate insulation layer and a double-layered capacitor electrode on said double-layered silicon pattern.

10. The method according to claim 9, wherein the double-layered capacitor electrode overlaps a portion of the gate line, consists of the second barrier metal layer and the second metal layer of copper, and is connected in parallel with the pixel electrode through a contact hole formed in the passivation layer.

* * * * *